United States Patent
Chung et al.

(10) Patent No.: US 10,009,159 B2
(45) Date of Patent: *Jun. 26, 2018

(54) METHOD AND APPARATUS FOR CONFIGURING A TRANSMISSION MODE FOR A BACKHAUL LINK TRANSMISSION

(71) Applicant: LG ELECTRONICS INC., Seoul (KR)

(72) Inventors: Jae Hoon Chung, Anyang-si (KR); Moon Il Lee, Anyang-si (KR); Seung Hee Han, Anyang-si (KR); Min Seok Noh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/257,159

(22) Filed: Sep. 6, 2016

(65) Prior Publication Data
US 2016/0380735 A1 Dec. 29, 2016

Related U.S. Application Data

(63) Continuation of application No. 14/555,263, filed on Nov. 26, 2014, now Pat. No. 9,455,776, which is a
(Continued)

(51) Int. Cl.
*H04L 5/00* (2006.01)
*H04B 7/155* (2006.01)
(Continued)

(52) U.S. Cl.
CPC ........... *H04L 5/0048* (2013.01); *H04B 7/155* (2013.01); *H04B 7/15557* (2013.01);
(Continued)

(58) Field of Classification Search
CPC .............................. H04L 5/0048; H04L 27/26
(Continued)

(56) References Cited

U.S. PATENT DOCUMENTS

| 8,194,600 B2 | 6/2012 | Nagaraja |
| 8,274,924 B2 | 9/2012 | Cai et al. |

(Continued)

FOREIGN PATENT DOCUMENTS

EP 2493092 A2 8/2012

OTHER PUBLICATIONS

Huawei, "Considerations on R-PDCCH for Type 1 relays", 3GPP TSG RAN WG1 Meeting #57bis, R1-092375, Jun. 29-Jul. 3, 2009, Los Angeles, CA, (4 pages).

(Continued)

*Primary Examiner* — Qutbuddin Ghulamali
(74) *Attorney, Agent, or Firm* — Birch, Stewart, Kolasch & Birch, LLP

(57) ABSTRACT

A method is provided for demodulating a signal. A relay node receives control information, from an evolved-NodeB (eNB), through a relay-physical downlink control channel (R-PDCCH), and receives a data, from the eNB, through a physical downlink shared channel (PDSCH). When a number of transmission layers of the PDSCH is 2 or more than 2 and a plurality of reference signals for a demodulation of the data are transmitted on antenna ports by the eNB, a reference signal transmitted on a minimum antenna port among the antenna ports is used for a demodulation of the control information.

8 Claims, 28 Drawing Sheets

Related U.S. Application Data continuation of application No. 13/383,804, filed as application No. PCT/KR2010/004555 on Jul. 13, 2010, now Pat. No. 8,934,523.

(60) Provisional application No. 61/236,549, filed on Aug. 25, 2009, provisional application No. 61/233,124, filed on Aug. 11, 2009, provisional application No. 61/226,285, filed on Jul. 17, 2009, provisional application No. 61/225,206, filed on Jul. 13, 2009.

(51) Int. Cl.
| | | |
|---|---|---|
| *H04W 92/12* | (2009.01) | |
| *H04W 52/14* | (2009.01) | |
| *H04W 52/32* | (2009.01) | |
| *H04W 52/58* | (2009.01) | |
| *H04L 27/26* | (2006.01) | |
| *H04W 84/04* | (2009.01) | |

(52) U.S. Cl.
CPC ............ *H04L 27/26* (2013.01); *H04W 52/146* (2013.01); *H04W 52/325* (2013.01); *H04W 52/58* (2013.01); *H04W 84/047* (2013.01); *H04W 92/12* (2013.01)

(58) Field of Classification Search
USPC .................................................. 375/211–212
See application file for complete search history.

(56) References Cited

U.S. PATENT DOCUMENTS

| 8,804,586 | B2 | 8/2014 | Fong et al. | |
|---|---|---|---|---|
| 8,842,622 | B2* | 9/2014 | Zhang | H04B 7/024 |
| | | | | 370/203 |
| 2008/0070582 | A1 | 3/2008 | Cai | |
| 2009/0016461 | A1 | 1/2009 | Jitsukawa et al. | |
| 2009/0104911 | A1 | 4/2009 | Watanabe et al. | |
| 2010/0008282 | A1* | 1/2010 | Bhattad | H04J 11/0069 |
| | | | | 370/312 |

OTHER PUBLICATIONS

Nortel Networks, "Control Channel and Data Channel Design for Relay Link in LTE-Advanced", 3GPP TSG RAN WG1 #55bis, R1-090153, Jan. 12-16, 2009, Ljubljana, Slovenia, (17 pages).

Qualcomm Europe, "Backhaul Link Design in SUpport of Relayhing Operation," 3GPP TSG-RAN WG1 #57bis, Agenda Item 15.3, R1-092702, Los Angeles, California, US, Jun. 29-Jul. 3, 2009, 3 pages.

ZTE, "Considerations on Demodulation Reference Signal in Backhaul Downlink," TSG-RAN WG1 #58, Agenda Item 15.3, R1-093204, Shenzhen, China, Aug. 24-28, 2009, 6 pages.

ETRI, "Reference signals for eNB-relay backhaul link," 3GPP TSG RAN WG1 Meeting #57bis, R1-092302, Los Angeles, USA, Jun. 29-Jul. 3, 2009, pp. 1-3.

Nortel, "Discussion paper on the control channel and data channel optimization for relay link," 3GPP TSG-RAN Working Group 1 Meeting #56bis, R1-091384, Seoul, Korea, Mar. 23-27, 2009, 9 pages.

Qualcomm Incorporated, "Synchronous TDM-Based Communication in Dominant Interference Scenarios," Complete Specification filed Dec. 23, 2010 (Published Sep. 16, 2011), 46 pages.

\* cited by examiner

FIG. 8
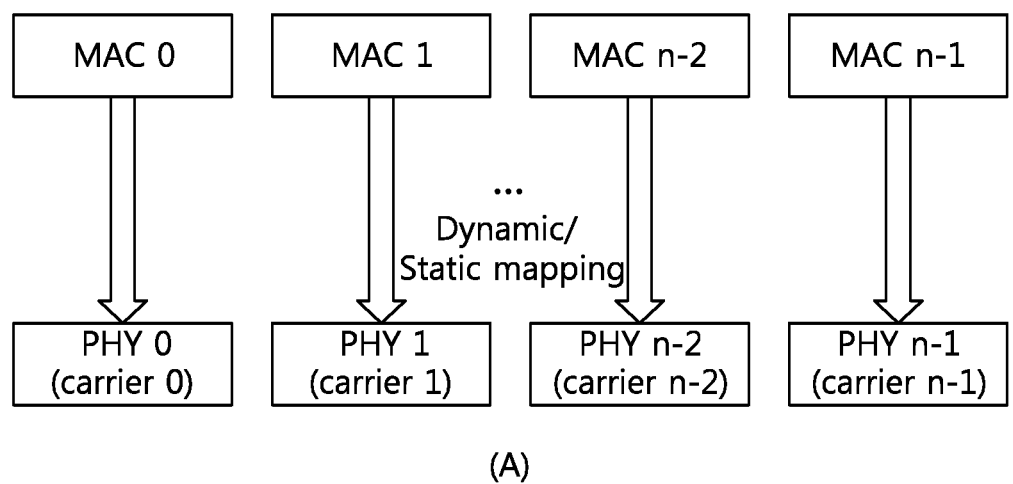
(A)
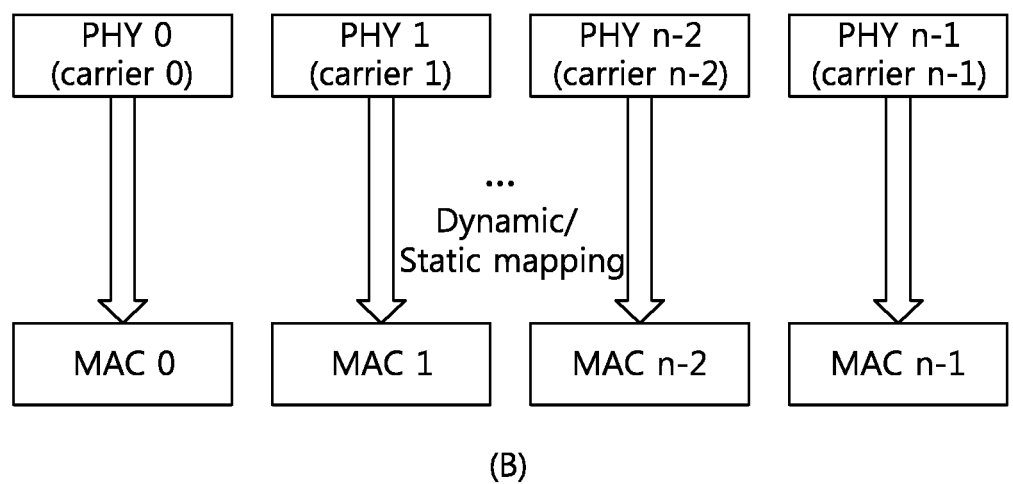
(B)

FIG. 9
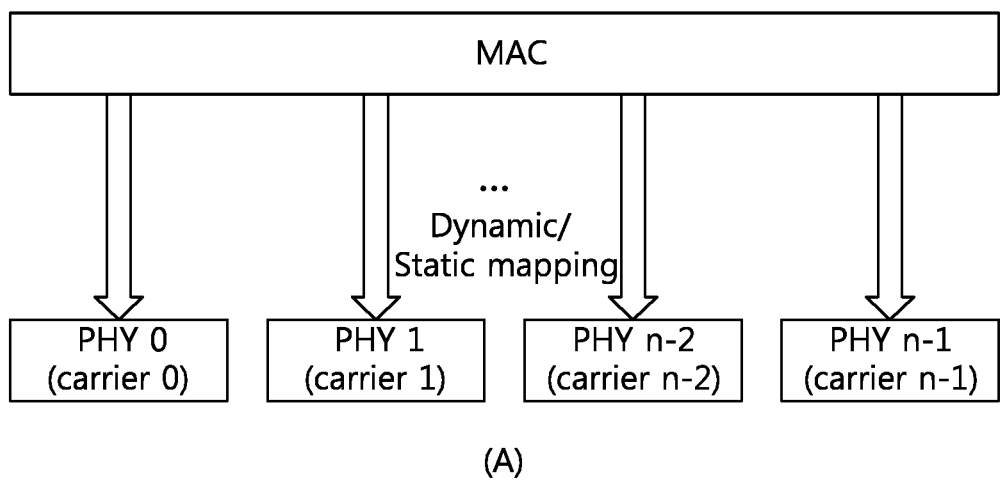
(A)
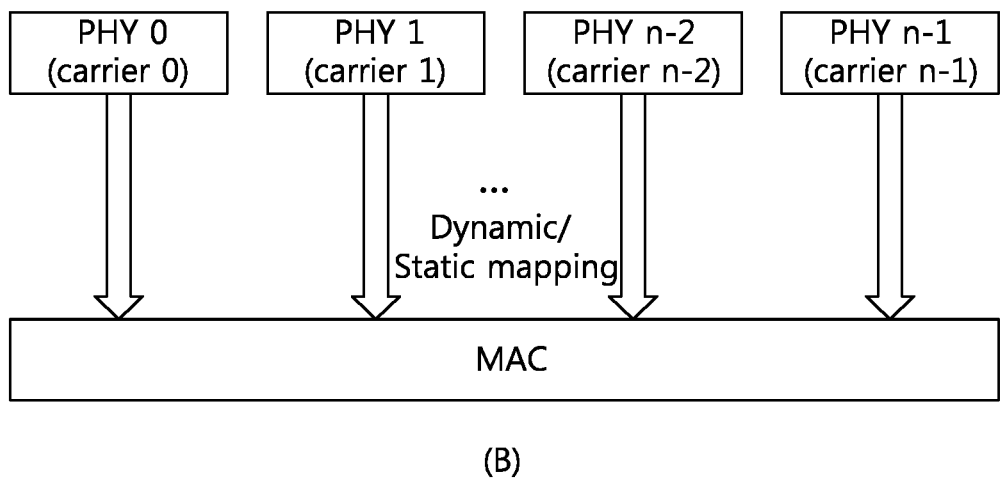
(B)

METHOD AND APPARATUS FOR CONFIGURING A TRANSMISSION MODE FOR A BACKHAUL LINK TRANSMISSION

CROSS-REFERENCE TO RELATED APPLICATIONS

This Application is a Continuation of U.S. patent application Ser. No. 14/555,263 filed on Nov. 26, 2014 (now U.S. Pat. No. 9,455,776 issued on Sep. 27, 2016), which is a Continuation of U.S. patent application Ser. No. 13/383,804 filed on Jan. 20, 2012 (now U.S. Pat. No. 8,934,523 issued on Jan. 13, 2015), which is filed as the National Phase of PCT/KR2010/004555 filed on Jul. 13, 2010, which claims the benefit under 35 U.S.C. § 119(e) to U.S. Provisional Application Nos. 61/236,549 filed on Aug. 25, 2009, 61/233,124 filed on Aug. 11, 2009, 61/226,285 filed on Jul. 17, 2009, and 61/225,206 filed on Jul. 13, 2009, all of which are hereby expressly incorporated by reference into the present application.

BACKGROUND OF THE INVENTION

ITU-R (International Telecommunication Union Radio communication sector) is in progress with standardization of IMT (International Mobile Telecommunication)-Advanced which is a next-generation mobile communication system standard after third generation communication systems. IMT-Advanced aims to support IP (Internet Protocol)-based multimedia services that may provide a data rate up to 1 Gbps in stationary or low-speed moving situations and a data rate up to 100 Mbps while moving at high speed.

3GPP ($3^{rd}$ Generation Partnership Project) prepares for LTE-Advanced that is an advancement of LTE (Long Term Evolution) based on OFDMA (Orthogonal Frequency Division Multiple Access)/SC-FDMA (Single Carrier-Frequency Division Multiple Access) transmission schemes as system standards satisfying IMT-Advanced. LTE-Advanced is a leading candidate for IMT-Advanced. As main technologies, LTE-Advanced includes relay station related technologies.

A relay station is a device that relays signals between a base station and a terminal and used to expand cell coverage for a radio communication system and to enhance throughput of the system.

In an existing OFDM-based mobile communication system, a network has been configured so that a base station is directly connected to a terminal. However, in an advanced OFDM-based mobile communication system, a base station may be connected to a terminal via a relay station. That is, relay stations relay communication between base stations and terminals by transmitting transmission upstream or downstream transmission packets. This scheme is called "relaying".

In a radio communication system including a relay station, a link between a base station and the relay station is referred to as a "backhaul link". A link through which the base station transmits signals to the relay station is referred to as a "backhaul downlink", and a link through which the relay station transmits signals to the base station is referred to as a "backhaul uplink". There are various transmission modes that may apply to the backhaul downlink and the backhaul uplink. For example, such transmission modes include a single antenna transmission mode, which is a most basic transmission mode, a transmit diversity mode using a plurality of antennas, a rank 1 single codeword precoding transmission mode, a closed loop precoding based spatial multiplexing mode, and an open loop precoding based spatial multiplexing mode. Of such various transmission modes, any one or more transmission modes may be applicable to the backhaul downlink and/or backhaul uplink.

A control channel through which a base station transmits control information to a relay station is called "R-PDCCH (relay-physical downlink control channel)", and a data channel through which the base station transmits data to the relay station is called "R-PDSCH (relay physical downlink shared channel). There is a problem as to how to configure a transmission mode for R-PDCCH and R-PDSCH that are transmitted on the subframe in the backhaul downlink. There is also a problem as to how to configure reference signals that apply to decoding for each of various transmission modes.

SUMMARY OF THE INVENTION

A method of configuring a transmission mode in a backhaul link between a base station and a relay station, a method of configuring a reference signal applying to each transmission mode, and an apparatus for the same are provided.

According to an aspect of the present invention, there is provided a method of configuring a transmission mode for backhaul link transmission in a radio communication system including a relay station, the method comprising transmitting a R-PDCCH (relay-physical downlink control channel) including backhaul control information from a base station to the relay station and transmitting a R-PDSCH (relay-physical downlink shared channel) including backhaul data from the base station to the relay station, wherein the R-PDCCH is transmitted in any one selected from a plurality of predetermined transmission modes and wherein a reference signal transmitted through the R-PDCCH for demodulation of the R-PDCCH is determined based on the selected transmission mode.

The R-PDCCH may be transmitted in S OFDM symbols (S is a natural number between 1 and 6) in a backhaul downlink subframe including a plurality of OFDM (orthogonal frequency division multiplexing) symbols in a time domain, and the S OFDM symbols may be located after a protection section necessary for a transmission/reception switching of the relay station and OFDM symbols in the backhaul downlink subframe in which the relay station transmits control information to a relay station terminal.

When a transmission mode for transmitting the R-PDCCH is a single antenna transmission mode or a transmit diversity transmission mode using a plurality of antennas, the reference signal transmitted for demodulation of the R-PDCCH may be a reference signal commonly transmitted from the base station in a cell.

When a transmission mode for transmitting the R-PDCCH is a single antenna transmission mode or a transmit diversity transmission mode using a plurality of antennas, the reference signal transmitted for demodulation of the R-PDCCH may be a reference signal commonly transmitted from the base station in a cell and commonly transmitted to the relay station in the cell.

The reference signal transmitted for demodulation of the R-PDCCH may be mapped with a resource element of a fourth OFDM symbol in the backhaul downlink subframe and transmitted, or mapped with the resource element of the fourth OFDM symbol and a resource element of a sixth OFDM symbol and transmitted.

When a transmission mode for transmitting the R-PDCCH is a transmission mode to which a precoding matrix or a precoding vector applies, the reference signal transmitted for demodulation of the R-PDCCH may use part of the reference signal transmitted for demodulation of the R-PDSCH.

The transmission mode for transmitting the R-PDCCH may be rank 1 transmission or rank 2 transmission.

When a transmission mode for transmitting the R-PDCCH is equal to the transmission mode for transmitting the R-PDSCH, the reference signal transmitted for demodulation of the R-PDCCH may use part of the reference signal transmitted for demodulation of the R-PDSCH.

According to another aspect of the present invention, there is provided a relay station comprising a RF unit transmitting and receiving radio signals and a processor connected to the RF unit, wherein the processor receives a R-PDCCH (relay-physical downlink control channel) including backhaul control information and a R-PDSCH (relay-physical downlink shared channel) including backhaul data from a base station, wherein the R-PDCCH is received in any one selected from a plurality of predetermined transmission modes and wherein a reference signal transmitted through the R-PDCCH for demodulation of the R-PDCCH is determined based on the selected transmission mode.

The R-PDCCH may be received in S OFDM symbols (S is a natural number between 1 and 6) in a backhaul downlink subframe including a plurality of OFDM (orthogonal frequency division multiplexing) symbols in a time domain, and the S OFDM symbols may be located after a protection section necessary for a transmission/reception switching of the relay station and OFDM symbols in the backhaul downlink subframe in which the relay station transmits control information to a relay station terminal.

Various transmission modes may apply to the backhaul link between the base station and relay station. The transmission mode of the control information transmission channel according to each transmission mode and transmission method of the reference signal used for the corresponding transmission mode are provided.

BRIEF DESCRIPTION OF THE DRAWINGS

FIG. 8, including view (a) and view (b), illustrates an example of a transmitter and a receiver in which multiple MACs operate multiple carriers.

FIG. 9, including view (a) and view (b), illustrates a transmitter and a receiver in which one MAC operates multiple carriers.

DETAILED DESCRIPTION OF THE EMBODIMENTS

The below-described technologies may be used for various radio communication systems, such as communication systems based on CDMA (code division multiple access), FDMA (frequency division multiple access), TDMA (time division multiple access), OFDMA (orthogonal frequency division multiple access), SC-FDMA (single carrier frequency division multiple access). CDMA may be implemented as a radio technology such as UTRA (Universal Terrestrial Radio Access) or CDMA2000. TDMA may be implemented as radio technologies such as GSM (Global System for Mobile communication)/GPRA (General Packet Radio Service)/EDGE (Enhanced Data Rates for GSM Evolution). OFDMA may be implemented as radio technologies such as IEEE 802.11 (Wi-Fi), IEEE 802.16e (WiMAX), IEEE 802-20, E-UTRA (Evolved UTRA). UTRA is part of UMTS (Universal Mobile Telecommunications System). 3GPP (3rd Generation Partnership Project) LTE (long term evolution) is part of E-UMTS (Evolved UMTS) using E-UTRA and adopts OFDMA for downlink and SC-FDMA for uplink. LTE-Advanced (LTE-A) is an advanced version of LTE. For clarity, 3GPP LTE/LTE-A is described as an example, but the present invention is not limited thereto.

Figure 1:
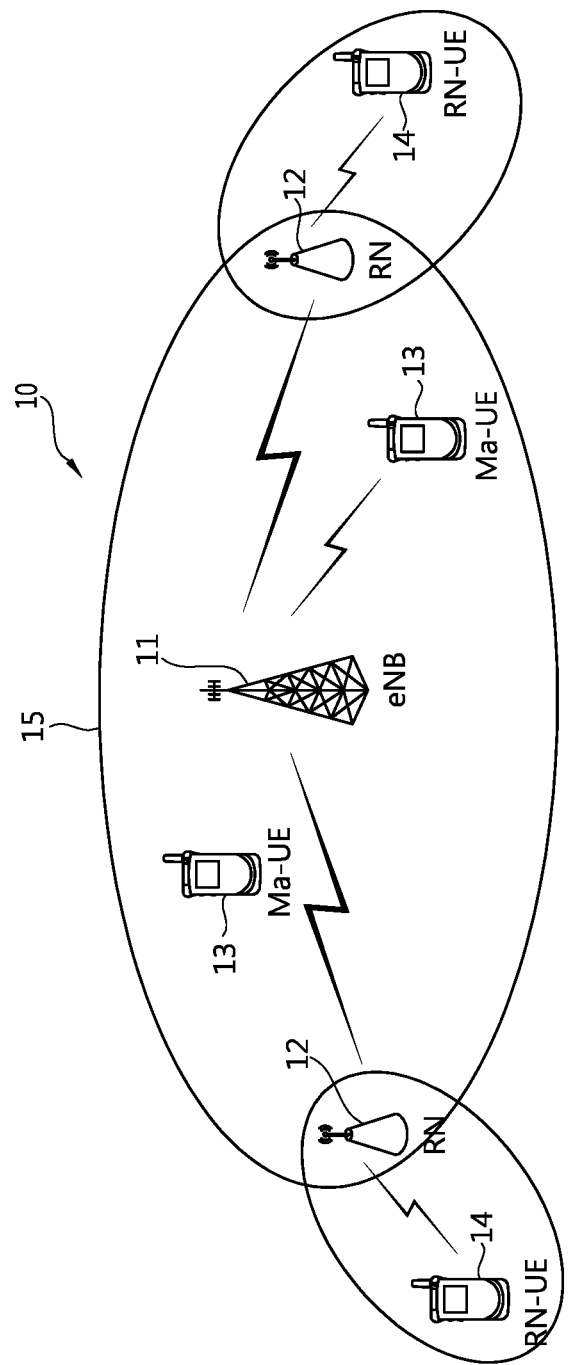
FIG. 1 illustrates a radio communication system including relay stations.

FIG. 1 illustrates a radio communication system including relay stations.

Referring to FIG. 1, the radio communication system 10 including relay stations includes at least one base station 11 (eNodeB, eNB). Each base station 11 provides communication services in a specific geographical area 15 which is generally called a "cell". The cell may be divided into multiple subareas each of which is called a "sector". One base station may include one or more cells. The base station 11 refers to a fixed station communicating with a terminal 13 and may have various names, such as BS (Base Station), BTS (Base Transceiver System), AP (Access Point), or AN (Access Network). The base station 11 may perform functions such as connectivity, management, control, and resource allocation between a relay station 12 and a terminal 14.

The relay station 12 (Relay Node, RN) is a device relaying signals between the base station 11 and the terminal 14, and may have different names, such as RS (Relay Station), repeater, or relay. The relay station 12 may adopt various relay schemes, such as, but not limited to, AF (amplify and forward) and DF (decode and forward).

The terminals 13 and 14 (User Equipment, UE) may be stationary or mobile and may have various names, such as MS (Mobile Station), UT (User Terminal), SS (Subscriber Station), wireless device, PDA (Personal Digital Assistant), wireless model, handheld device, or AT (Access Terminal). Hereinafter, a macro terminal (macro UE, Ma-UE, 13) refers to a terminal directly communicating with the base station 11, and a relay terminal (RN-UE, 14) refers to a terminal communicating with the relay station. Although in the cell of the base station 11, the macro terminal 13 may communicate with the base station 11 via the relay station 12 to enhance transmission rate based on diversity effects.

Figure 2:
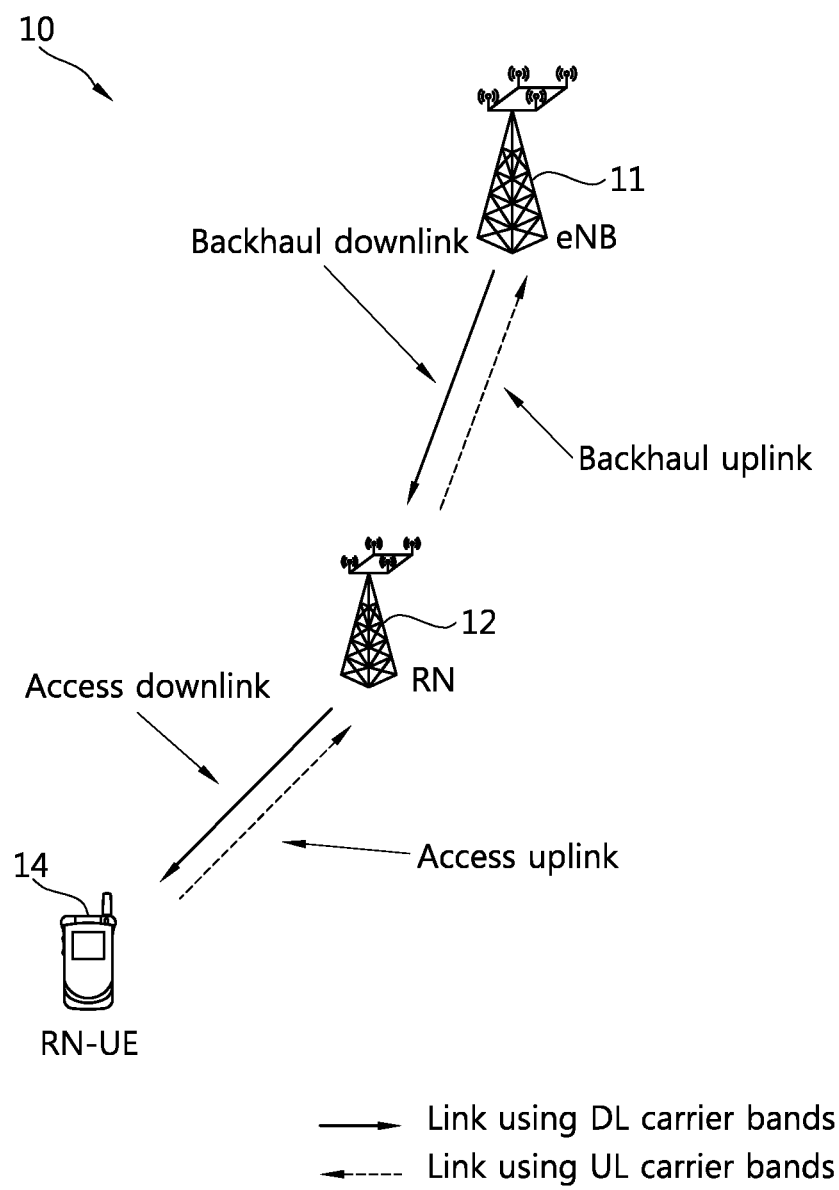
FIG. 2 exemplifies links present in a radio communication system including a relay station.

FIG. 2 exemplifies links present in a radio communication system including a relay station.

When a relay station is located between a base station and a terminal, a link may differ from a link in a radio communication system including only base station(s) and terminal(s). A downlink and an uplink between the base station and terminal, respectively, refer to a communication link from the base station to the terminal and a communication link from the terminal to the base station. In the case of adopting TDD (Time Division Duplex), downlink transmission and uplink transmission are performed at different subframes. In the case of adopting FDD (Frequency Division Duplex), downlink transmission and uplink transmission are performed at different frequency bands. In TDD, downlink transmission and uplink transmission are performed at different times and may use the same frequency band. On the contrary, in FDD, downlink transmission and uplink transmission may be performed at the same time of period but use different frequency bands.

In addition to the above-described uplink and downlink, in the case that a relay station is included between the base station and the terminal, backhaul links and access links may be provided. The backhaul links refer to communication links between the base station and the relay station, and include a backhaul downlink through which the base station transmits signals to the relay station and a backhaul uplink through which the relay station transmits signals to the base station. The access links refer to communication links between the relay station and a terminal connected to the relay station—this terminal is referred to as a "relay station terminal," and include an access downlink through which the relay station transmits signals to the relay station terminal and an access uplink through which the relay station terminal transmits signals to the relay station.

In the backhaul downlink and access downlink, 1) in case of TDD, transmission may be performed at the same time resources as the downlink, that is, at the subframes, and 2) in case of FDD, transmission may be performed at the same frequency resources as the downlink, that is, at the frequency bands. In the backhaul uplink and access uplink, 1) in case of TDD, transmission may be performed at the same time resources as the uplink, that is, at the subframes, and 2) in case of FDD, transmission may be performed at the same frequency resources as the uplink, that is, at the frequency bands.

In other words, the base station may have a receiving module (a transmitting module in case of the terminal) for the uplink and a transmitting module (a receiving module in case of the terminal) for the downlink. On the contrary, the relay station should have a transmitting module for the backhaul uplink adopting the same radio resources as the uplink and a receiving module for the access uplink. Further, the relay station should have a receiving module for the backhaul downlink adopting the same radio resources as the downlink and a transmitting module for the access downlink. This can be represented as in the following table:

TABLE 1

| Functionality | eNodeB | Relay node | UE |
| --- | --- | --- | --- |
| DL TX | 0 | 0 | |
| DL RX | | 0 | 0 |
| UL TX | | 0 | 0 |
| UL RX | 0 | 0 | |

Figure 3:
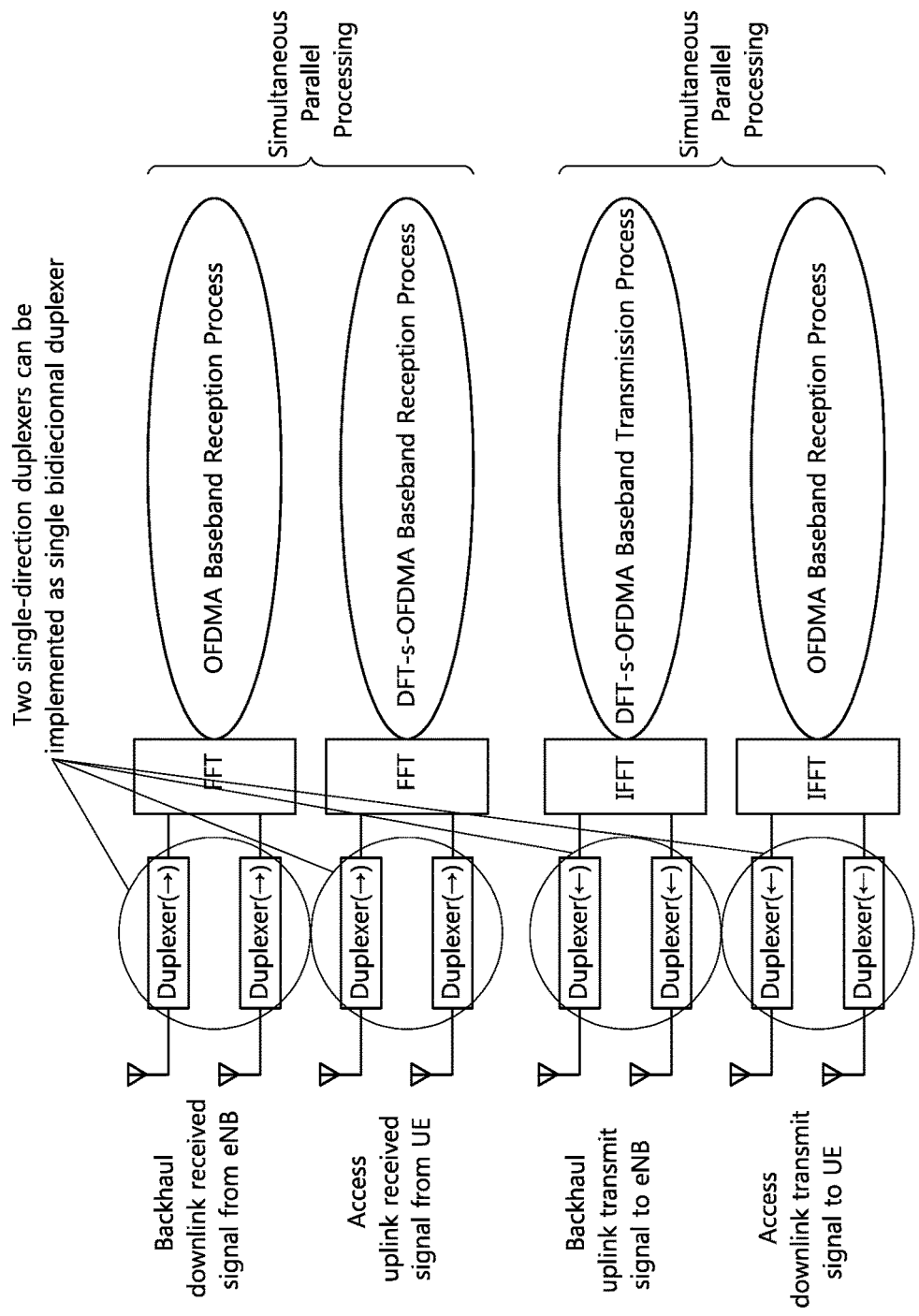
FIG. 3 is a view conceptually illustrating implementations of functional modules in a relay station in light of implementing a device.

FIG. 3 is a view conceptually illustrating implementations of functional modules in a relay station in light of implementing a device.

Referring to FIG. 3, a relay station should be able to receive signals from a base station in a backhaul downlink and perform OFDMA signal process via FFT (Fast Fourier Transform). The relay station should also be able to receive signals from a relay station terminal in an access uplink and perform OFDMA signal process through FFT. The above two procedures may be performed at the same time.

The relay station should be able to transmit signals to the base station after performing DFT-s-OFDMA (SC-FDMA) signal process in the backhaul uplink. The relay station should also be able to transmit signals to the relay station terminal after performing DFT-s-OFDMA (SC-FDMA) signal process in the access downlink. The above two procedures may be simultaneously performed.

However, it is assumed to be difficult for the relay station to receive signals from the relay station terminal in the access uplink while simultaneously transmitting signals to the base station in the backhaul uplink. It is also assumed that it is difficult for the relay station to receive signals from the base station in the backhaul downlink while simultaneously transmitting signals to the relay station terminal in the access downlink.

If a duplexer is implemented in both directions, IFFT and base band module line associated with transmission/reception over a certain carrier frequency band may be represented as being split.

Figure 4:
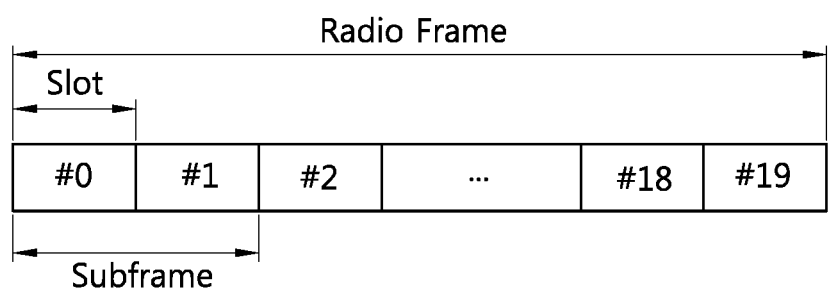
FIG. 4 illustrates a structure of a 3GPP LTE radio frame.

FIG. 4 illustrates a structure of a 3GPP LTE radio frame.

Referring to FIG. 4, a radio frame includes ten subframes each of which includes two slots. The length of each subframe may be 1 ms and the length of each slot may be 0.5 ms. Time taken for one subframe to be transmitted is referred to as a TTI (Transmission Time Interval). TTI may be a minimum unit for scheduling.

One slot may include a plurality of OFDM (Orthogonal Frequency Division Multiplexing) symbols in a time region. The OFDM symbol uses OFDMA for downlink in case of 3GPP LTE, and thus, may be called another name to represent a symbol period. For instance, in the case that SC-FDMA is used for uplink multiple access, it can be referred to as SC-FDMA symbol. Although it is described as an example that one slot includes seven OFDM symbols, the number of OFDM symbols included in one slot may vary according to the length of CP (Cyclic Prefix). According to 3GPP TS 36.211 V8.5.0 (2008-12), for normal CP, one subframe includes seven OFDM symbols and for extended CP, one subframe includes six OFDM symbols. The radio frame structure is merely an example, and the number of the subframes included in the radio frame and the number of slots included in the subframe may change. Hereinafter, the symbol may denote one OFDM symbol or one SC-FDMA symbol.

For the radio frame structure described in connection with FIG. 4, refer to section.4.1 and section.4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

Figure 5:
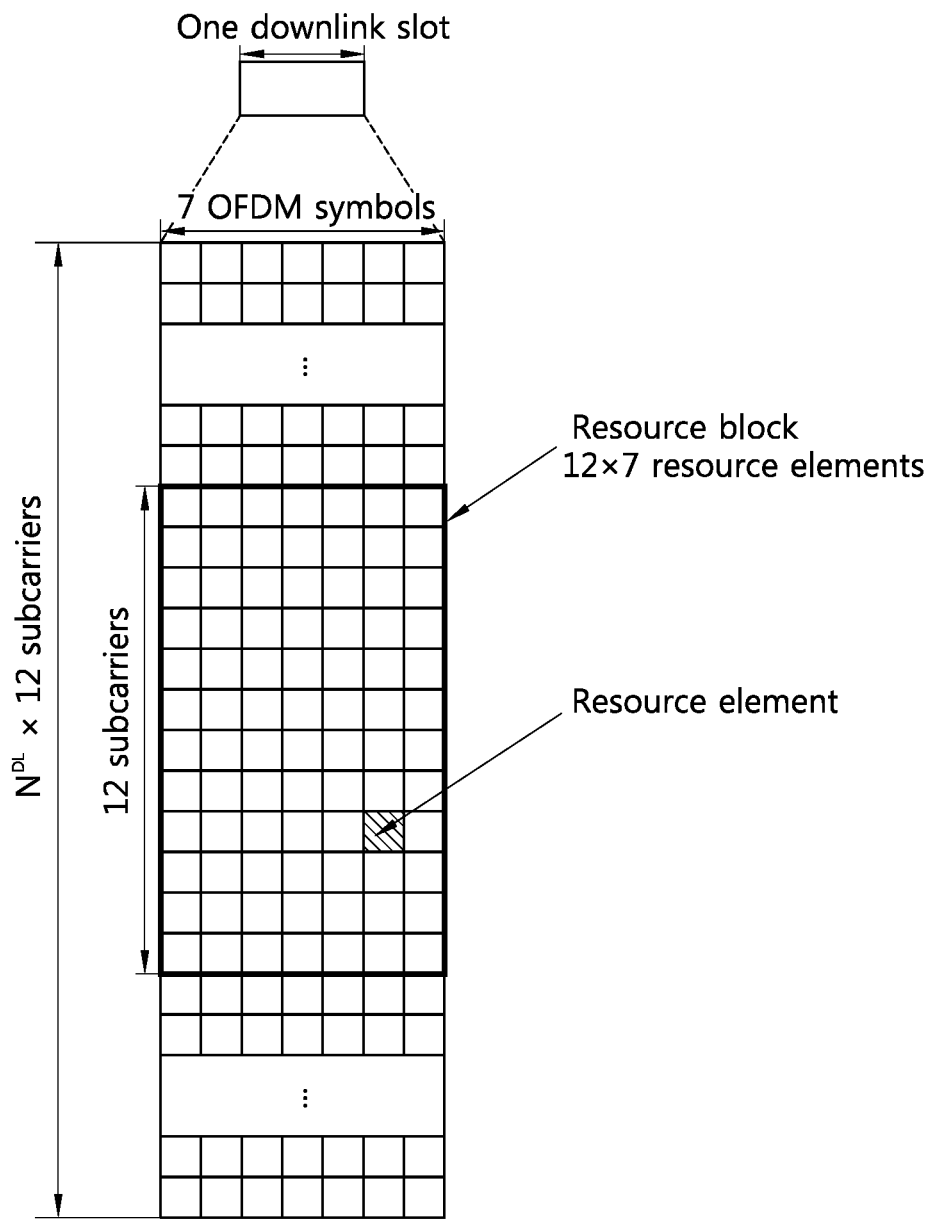
FIG. 5 illustrates an example of a resource grid for one downlink slot.

FIG. 5 illustrates an example of a resource grid for one downlink slot.

In a radio frame used for FDD or TDD, one slot includes plural OFDM symbols in the time domain and plural resource blocks (RBs) in the frequency domain. The resource block includes a plurality of consecutive subcarriers in one slot as a resource allocation unit.

Referring to FIG. 5, one downlink slot includes seven OFDM symbols and one resource block includes twelve subcarriers in the frequency domain. However, the present invention is not limited thereto. The subcarriers in the resource block may have an interval of, e.g., 15 KHz.

Each element on the resource grid is called "resource element" and one resource block includes 12×7 resource elements. The number (NDL) of resource blocks included in the downlink slot depends upon a downlink transmission bandwidth set in a cell. The resource grid described in connection with FIG. 5 may apply to the uplink as well.

Figure 6:
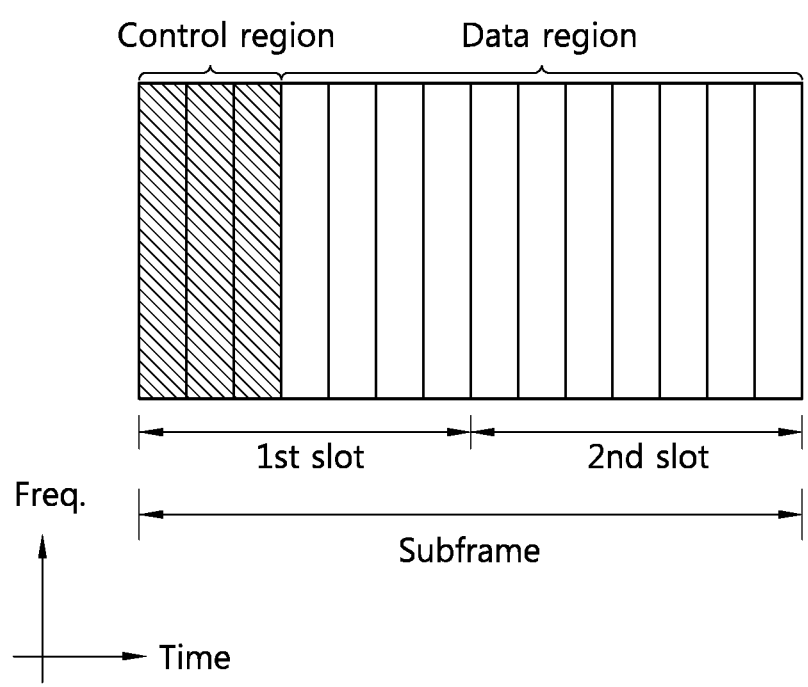
FIG. 6 illustrates a structure of a downlink subframe.

FIG. 6 illustrates a structure of a downlink subframe.

Referring to FIG. 6, a subframe includes two consecutive slots. First three OFDM symbols in the first slot of the subframe correspond to a control region to which a PDCCH (Physical Downlink Control Channel) is allocated and the other OFDM symbols correspond to a data region to which a PDSCH (Physical Downlink Shared Channel) is allocated. Besides the PDCCH, control channels, such as PCFICH (physical control format indicator channel), PHICH (physical HARQ indicator channel), etc., may be allocated in the control region. The terminal may decode control information transmitted through the PDCCH and may read data information transmitted through the PDSCH. Here, the control region including three OFDM symbols is merely an example, and the control region may include two OFDM symbols or a single OFDM symbol. The number of OFDM symbols included in the control region of the subframe may be known through the PCFICH which carries information on whether it is successful to receive uplink data transmitted from the terminal.

The control region includes a logical CCE column which includes plural CCEs (Control Channel Elements). The CCE column is a set of the whole CCEs constituting the control region in one subframe. The CCEs correspond to the plurality of resource element groups (REGs). For instance, the CCEs may correspond to nine REGs. The REG is used to define mapping the control channel with the resource elements. For instance, one REG may include four resource elements.

Plural PDCCHs may be transmitted in the control region. The PDCCH carries control information, e.g., associated with scheduling allocation. The PDCCH is transmitted onto a single or an aggregation of a few consecutive CCEs. The format of the PDCCH and the number of bits available for the PDCCH are determined based on the number of CCEs constituting the CCE aggregation. The number of CCEs used for transmission of the PDCCH is referred to as a "CCE aggregation level" which is a CCE unit for searching the PDCCH. The size of the CCE aggregation level is defined as the number of adjacent CCEs. For instance, the CCE aggregation level may be an element in a set {1, 2, 4, 8}.

Control information transmitted through the PDCCH is referred to as "downlink control information (DCI)". The DCI includes uplink scheduling information, downlink scheduling information, system information, uplink power control command, control information for paging, and control information used for instructing random access response (RACH response).

The DCI format includes format 0 for PUSCH (Physical Uplink Shared Channel) scheduling, format 1 for scheduling of a single PDSCH (Physical Downlink Shared Channel) codeword, format 1A for compact scheduling of a single PDSCH codeword, format 1B for compact scheduling for rank-1 transmission of a single codeword in a spatial multiplexing mode, format 1C for very compact scheduling of DL-SCH (Downlink Shared Channel), format 1D for PDSCH scheduling in a multiple user spatial multiplexing mode, format 2 for PDSCH scheduling in a closed-loop spatial multiplexing mode, format 2A for PDSCH scheduling in an open-loop spatial multiplexing mode, format 3 for transmission of TPC (Transmission Power Control) commands for two bit power control for PUCCH and PUSCH, and format 3A for transmission of TPC commands for one bit power control for PUCCH and PUSCH.

Figure 7:
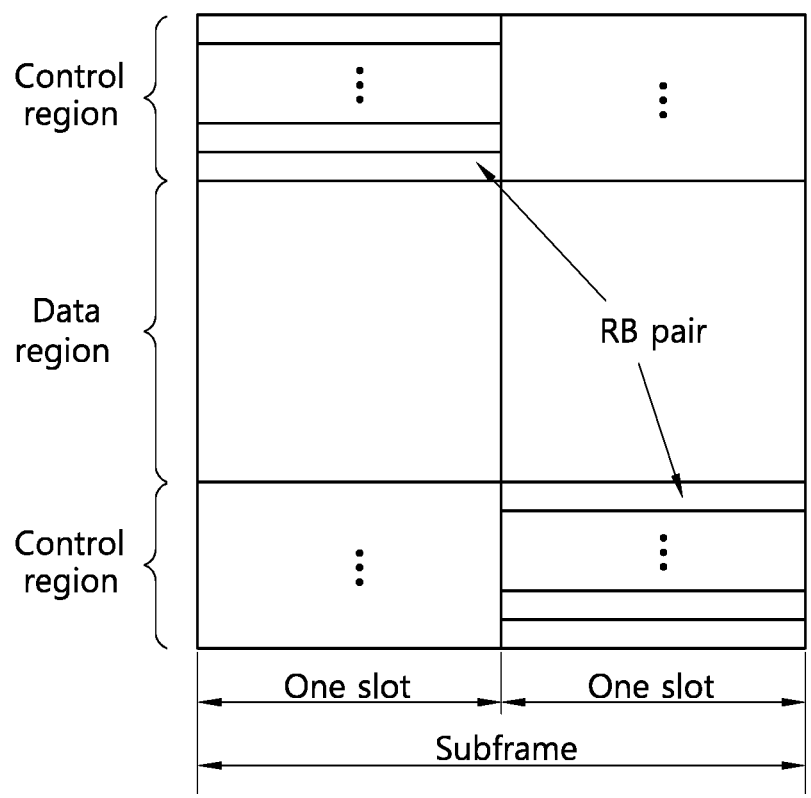
FIG. 7 illustrates a structure of an uplink subframe.

FIG. 7 illustrates a structure of an uplink subframe.

Referring to FIG. 7, the uplink subframe may include a control region to which a PUCCH (Physical Uplink Control Channel) is allocated to carry uplink control information in the frequency domain and a data region to which a PUSCH (Physical Uplink Shared Channel) is allocated to carry user data.

The PUCCH for a single terminal is allocated in a pair of RBs 51 and 52 in the subframe and the RBs 51 and 52 in the RB pair occupies different subcarriers in two slots, respectively. This is represented as "the RB pair allocated in the PUCCH is subjected to frequency hopping at a slot boundary".

The PUCCH may support multiple formats. That is, the PUCCH may transmit uplink control information having a different number of bits per frame depending on a modulating scheme. For example, in the case of using BPSK (Binary Phase Shift Keying) (PUCCH format 1a), one bit uplink control information may be transmitted over the PUCCH, and in the case of using QPSK (Quadrature Phase Shift Keying) (PUCCH format 1b), two bit uplink control information may be transmitted over the PUCCH. Other PUCCH formats include format 1, format 2, format 2a, and format 2b (for details, see section. 5.4 in 3GPP TS 36.211 V8.2.0 (2008-03) "Technical Specification Group Radio Access Network; Evolved Universal Terrestrial Radio Access (E-UTRA); Physical Channels and Modulation (Release 8)").

[Construction and Configuration of Carrier Aggregation]

A 3GPP release 8 (release 9 may be also included, hereinafter referred to as "3GPP LTE") system supports transmission/reception in a single carrier state that includes a scalable frequency band. That is, the 3GPP LTE system is a single carrier system that supports only a single bandwidth (that is, a single component carrier (CC)) among 1.4, 3, 5, 10, 15, and 20 MHz. For instance, the 3GPP LTE system supports up to 20 MHz and may have different uplink and downlink bandwidths. However, the 3GPP LTE system supports only one CC for the uplink and downlink.

On the contrary, a 3GPP LTE-A system uses multiple carriers (CCs) and supports carrier aggregation. The carrier aggregation (also referred to as "spectrum aggregation" or "bandwidth aggregation") supports wideband aggregated carriers by combining narrowband carriers. The carrier aggregation has been introduced to support growing throughput, prevent an increase in expenses due to adoption of wideband RF (Radio Frequency) elements, and guarantee comparability with existing systems. For example, if five CCs are allocated as granularity of a carrier unit having 20 MHz bandwidth, up to 100 MHz of bandwidth may be supported.

The size of CC (or the bandwidth of CC) may vary. For example, when five CCs are used to configure 70 MHz bandwidth, the configuration may be as follows: 5 MHz carrier (CC #0)+20 MHz carrier (CC #1)+20 MHz carrier (CC #2)+20 MHz carrier (CC #3)+5 MHz carrier (CC #4).

A situation where the number of downlink CCs is equal to the number of uplink CCs or the bandwidth of the downlink is equal to the bandwidth of the uplink is referred to as "symmetric aggregation". A situation where the number of downlink CCs is different from the number of uplink CCs or the bandwidth of the downlink is different from the bandwidth of the uplink is referred to as "asymmetric aggregation".

In a radio communication system supporting carrier aggregation, a cell or base station may perform downlink transmission to a terminal in the same time resource (for example, the subframe) using frequency resources (for example, subcarriers or resource blocks) over one or more carriers. Likewise, the terminal may perform uplink transmission to the cell or base station in the same time resource (for example, the subframe) using frequency resources (for example, subcarriers or resource blocks) over one or more carriers.

In the multiple carrier system, at least one or more MAC (Medium Access Control) entities may conduct transmission and reception by managing/operating at least one or more CCs. The MAC entity has a layer higher than the physical layer (PHY). For example, the MAC entity may have an MAC layer and/or its upper layer.

FIG. 8, including view (a) and view (b), illustrates an example of a transmitter and a receiver in which multiple MACs operate multiple carriers. FIG. 8(a) illustrates the transmitter and FIG. 8(b) illustrates the receiver. The multiple MACs (MAC 0, . . . , MAC n-1) are mapped to multiple physical layers (PHY 0, . . . , PHY n-1) in a one-to-one correspondence. Each CC has an independent physical layer and an independent MAC layer. The MAC layer of the transmitter performs L1/L2 scheduling for the MAC/RLC (Radio Link Control) layer and generation of MAC PDU (Protocol Data Unit). The MAC PDU generated in the MAC layer of the transmitter is converted into the transport block through the transport channel and then mapped to the physical layer.

FIG. 9, including view (a) and view (b), illustrates a transmitter and a receiver in which one MAC operates multiple carriers. FIGS. 9(a) and 9(b) illustrate the transmitter and the receiver, respectively. One physical layer (PHY) corresponds to one CC and multiple physical layers (PHY 0, . . . , PHY n-1) are operated by one MAC. The MAC may be mapped to the multiple physical layers (PHY 0, . . . , PHY n-1) dynamically or statically. The MAC PDU generated in the MAC layer of the transmitter is converted into the transport block through the transmission channel, decomposed, and then mapped to the physical layer.

In the radio communication system including the relay station, the relay station performs communication in the backhaul uplink/downlink and the access uplink/downlink, and relays signals between the base station and the terminal. The relay station may be classified into a few types as in Table 2 according to its functions:

TABLE 2

| Function | L1 Relay (Type-3 relay) | L2 Relay (Type-2 relay) | L3 Relay (Type-1 relay) |
| --- | --- | --- | --- |
| RF function | O | O | O |
| Coder/Decoder and CRC | — | O | O |
| HARQ | — | O | O |
| Multiplex & Demultiplex of MAC SDU | — | O | O |
| Priority(Qos) handling | — | O | O |
| Scheduling | — | O | O |
| Outer ARQ | — | (O) | O |
| (Re)-Segmentation and concatenation | — | (O) | O |
| Header compression(ROHC) | — | — | — |
| Reordering of lower layer SDUs | — | — | — |
| In-sequence delivery of upper layer PDUs | — | — | — |
| Duplicate detection of lower layer SDUs | — | — | — |
| Ciphering | — | — | — |
| System information broadcast | — | — | O |
| RRC Connection set-up and maintenance | — | — | O |
| Radio Bearers set-up and maintenance | — | — | — |
| Mobility function | — | — | O |
| MBMS services control | — | — | — |
| Paging | — | — | — |
| QoS management | — | — | (O) |
| UE measurement reporting and control the reporting | — | — | (O) |
| NAS signaling handling | — | — | — |

In Table 2, 'O' means that the corresponding function is supported, '(O)' that the corresponding function may be supported, and '-' that the corresponding function is not supported. The L1 relay station has a few additional functions as well as an AF (Amplify and Forward) function, which amplifies signals from the base station or terminal and then forwards the amplified signals to the terminal or base station. That is, the L1 relay station refers to a relay station that cannot perform an independent scheduling function and may be merely regarded as a repeater. The L2 relay station has a scheduling function together with a DF (Decoding and Forward) function, which restores information through procedures, e.g., by demodulating and decoding signals from the base station or terminal and then generates signals through procedures such as coding and modulation, then forwards the generated signals to the terminal or base station. The L3 relay station (type 1 relay station) is similar to one cell and in addition to functions owned by the L2 relay station, may support call connection and mobility functions. Although Table 2 classifies the relay stations into the L1 relay station (type 3 relay station), L2 relay station (type 2 relay station), and L3 relay station (type 1 relay station), the present invention is not limited thereto. Such classification is made depending on schematic characteristics of the L1, L2, and L3 relay stations, and does not completely comply with the terms. Hereinafter, type 1 relay station means a relay station that has the same functions as the base station (Hereinafter, "cell" is assumed to have the same meaning as the base station and that may include independent RRM (Radio Resource Management) and L1/L2 layers and may have a physical cell ID.

Figure 10:
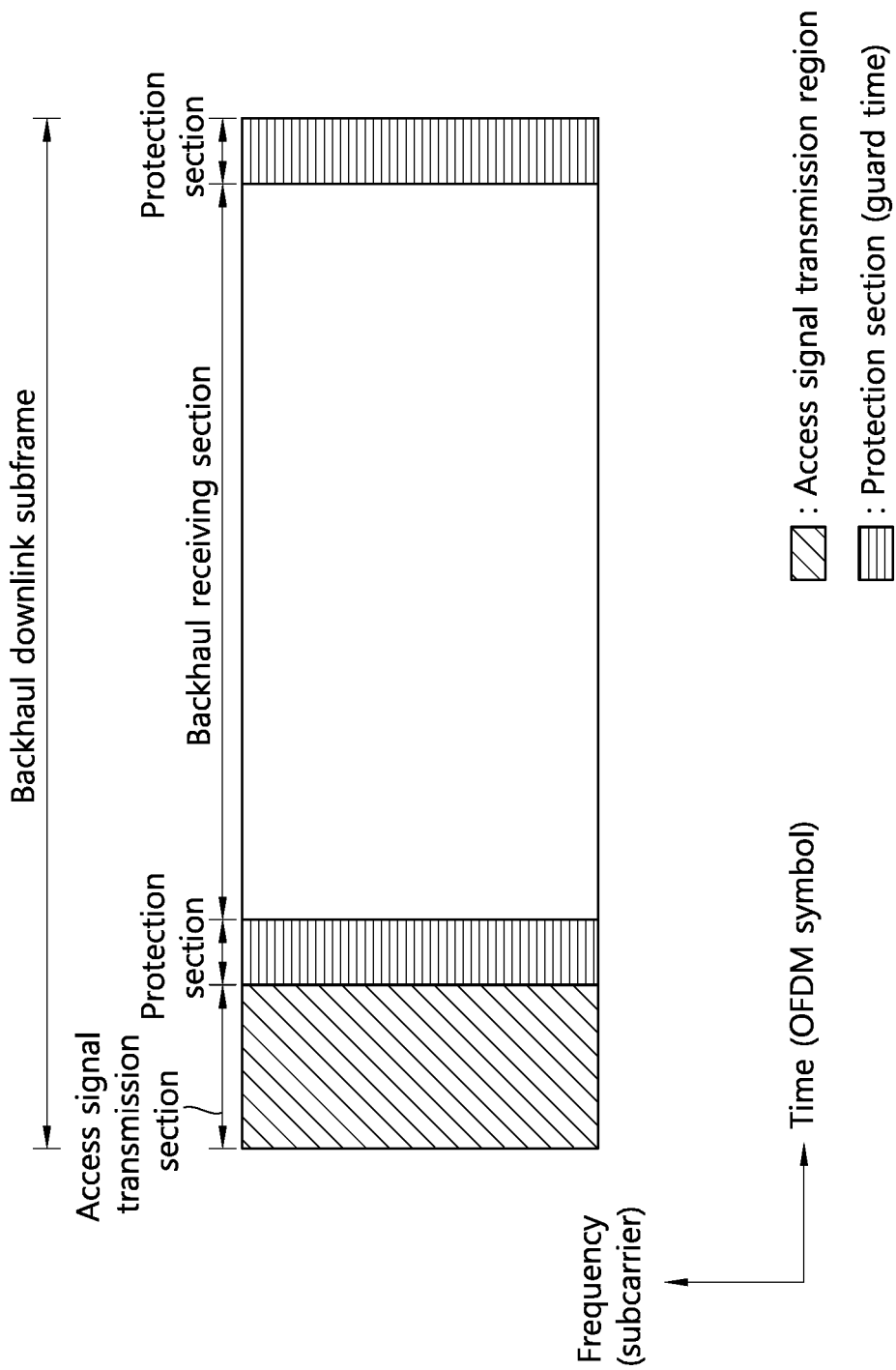
FIG. 10 illustrates an example of a backhaul downlink subframe.

FIG. 10 illustrates an example of a backhaul downlink subframe.

The backhaul downlink subframe may be divided in the time domain into an access signal transmission section, a protection section, and a backhaul receiving section.

The access signal transmission section includes first N (N is one of 1, 2, and 3) OFDM symbols of the subframe and may be used to transmit access downlink signals to the relay station terminal. The relay station transmits the access downlink signals to the relay station terminal in order to support signal measuring functions of the relay station terminal, especially legacy terminals that operate based on LTE release 8/9. The relay station may notify the legacy terminals through the access downlink signals that the subframe is used for signal reception of the base station. It is difficult for the relay station to receive signals from the base station due to self interference in the access signal transmission section.

The protection section is a time period for stabilization according to signal transmission/reception switching of the relay station and may be equal to or shorter than the length of one OFDM symbol, or as the case may be, may be longer than the length of one OFDM symbol. The protection section may be set as a time period in the time domain or may be set as a time sample value. Although two protection sections 301 and 302 located before and after the backhaul receiving section are shown in FIG. 10, the present invention is not limited thereto. That is, the protection section 302 located after the backhaul receiving section may be not provided when the backhaul downlink subframe is consecutively set or depending on timing alignment relation of the subframe. In this case, the backhaul receiving section may be extended up to the last OFDM symbol of the subframe. The protection section may be defined only for a frequency band set in order for the base station to transmit signals to the relay station over any downlink component carrier (DL CC).

During the backhaul receiving section, the relay station may receive signals from the base station in the downlink subframe. The backhaul receiving section may include, in the backhaul downlink subframe, all or some of the OFDM symbols except for the access signal transmission section and the protection section.

The OFDM symbols included in the backhaul receiving section and the access signal transmission section may be independently applied with a normal CP or extended CP.

For convenience of description, resources constituted of backhaul receiving sections in the time domain and bands allocated to the relay station in the frequency domain are referred to as a "backhaul receiving area". In the backhaul receiving area, R-PDCCH (relay-physical downlink control channel) and R-PDSCH (relay-physical downlink shared channel) are transmitted by the base station. As the case may be, R-PCFICH (relay-physical control format indicator channel) and/or R-PHICH (relay-physical HARQ indicator channel) may be additionally transmitted. The R-PDCCH is a control channel in which the base station transmits control information to the relay station, and the R-PDSCH is a data channel in which the base station transmits data to the relay station. The R-PCFICH is a channel transmitting information on the number of the OFDM symbols or the frequency band, and the R-PHICH is a channel transmitting HARQ ACK/NACK of the base station in response to the transmission of the backhaul uplink data by the relay station. Hereinafter, the x area refers to a radio resource area in which x is transmitted. For example, the R-PDCCH area means a radio resource area in which the R-PDCCH is transmitted by the base station.

In the case that the R-PDCCH and the R-PDSCH (if defined, R-PCFICH and/or R-PHICH are also included hereinafter) are mapped with physical resources and transmitted, various transmission modes may be present that apply to these channels. The definition and application method of reference signals RSs used for demodulation or decoding of the relay station depending on what transmission mode is to apply among the various transmission modes are hereinafter described.

Figure 11:
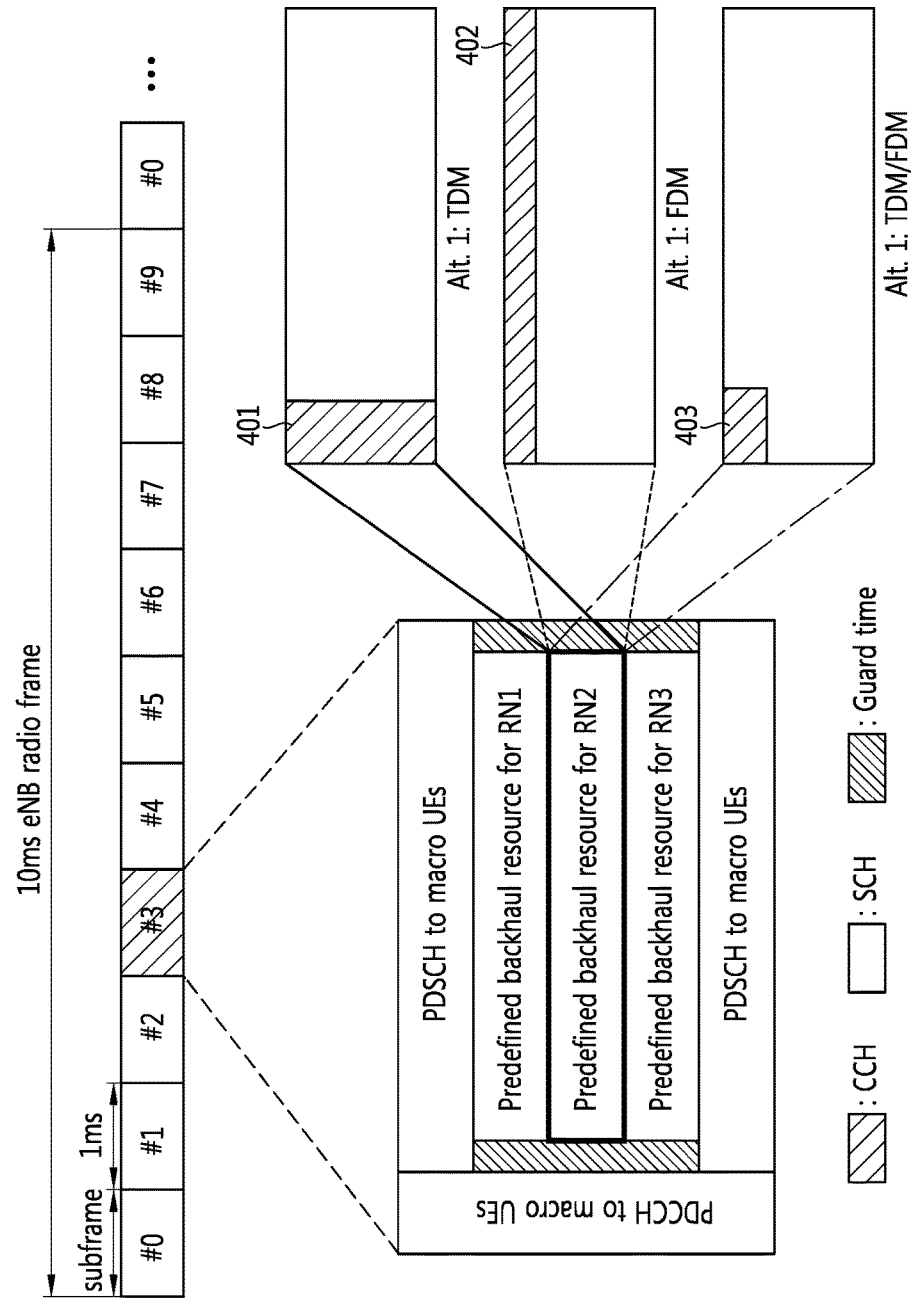
FIG. 11 illustrates an example of semi-statically allocating and configuring the R-PDCCH transmission resources.

FIG. 11 illustrates an example of semi-statically allocating and configuring the R-PDCCH transmission resources.

In the backhaul downlink, traffics are not likely to highly change because the terminal which is subjected to statistical multiplexing with the relay station varies with time. Accordingly, one way to support allocation of radio resources in the backhaul downlink is to previously define the size of backhaul resources allocated to the relay station and not to change the backhaul resources for a long time. That is, the way is to semi-statically allocate the backhaul resources. Such resource allocation method preferably fixes the transmission format of the backhaul link. The backhaul resources predefined in the backhaul downlink subframe are semi-statically scheduled and may be set or allocated through an upper level signal, such as RRC (Radio Resource Control).

In the predetermined backhaul resources, a control channel carrying L1/L2 control information such as HARQ ACK/NACK, CQI/PMI, or scheduling grant may be multiplexed with the backhaul data in the TDM (Time Division Multiplexing), FDM (Frequency Division Multiplexing), or TDM/FDM process.

When multiplexed in the TDM scheme, an area 401 to which the control channel is allocated is distinguished from an area to which data is allocated in the time domain. When multiplexed in the FDM scheme, an area 402 to which the control channel is allocated is distinguished from the area to which data is allocated in the frequency domain. When multiplexed in the TDM/FDM process, an area 403 to which the control channel is allocated is distinguished from an area to which data is allocated in the time and frequency domains.

The control information may be piggybacked to the backhaul data and subjected to coding/modulation, then transmitted.

The semi-static backhaul resource allocation method may reduce the amount of control information and load to scheduling of the base station scheduler. However, this method needs to be careful of management of the backhaul resources and of how to restore errors that might be happening.

Figure 12:
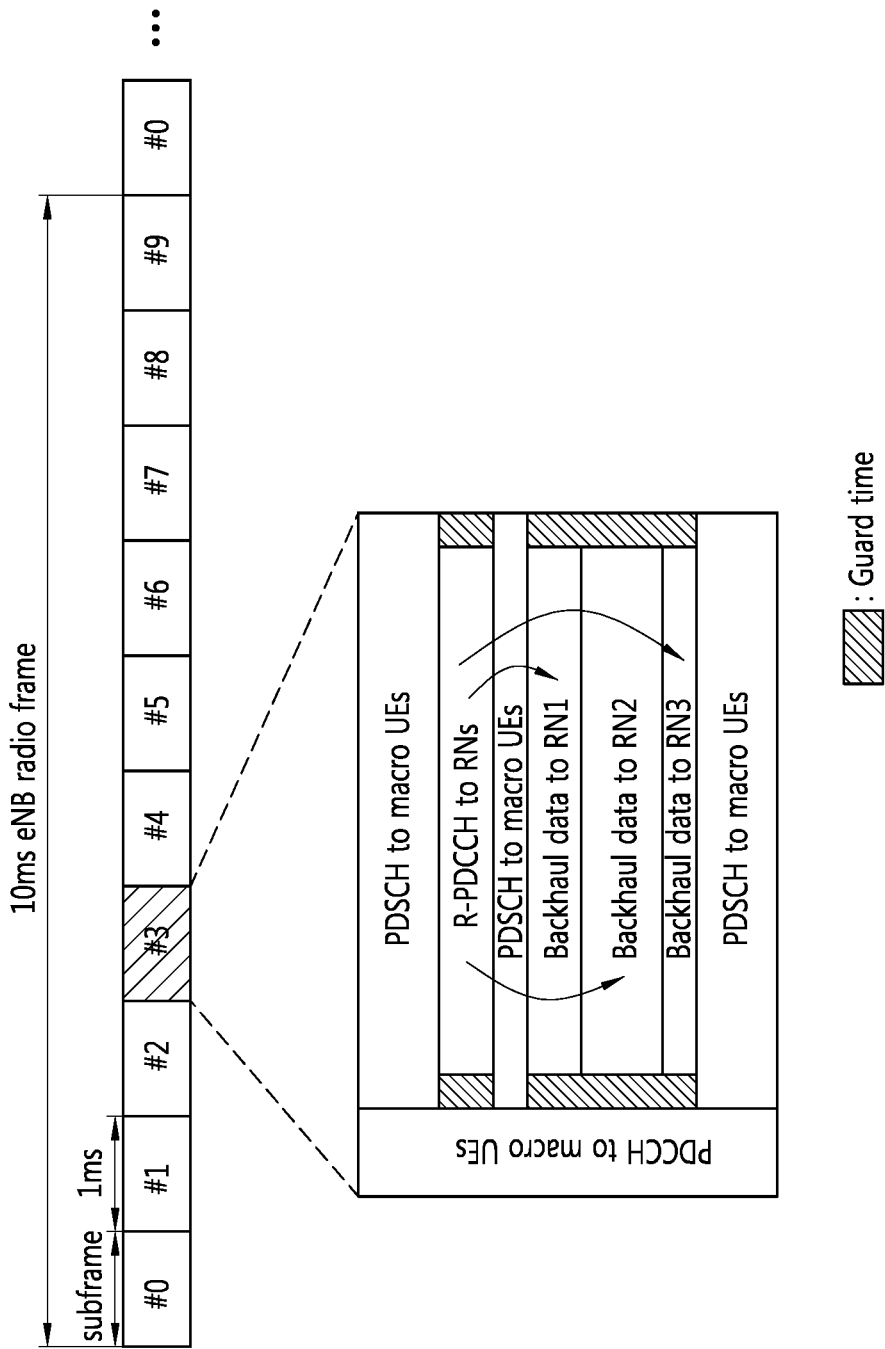
FIG. 12 illustrates an example of dynamically allocating and configuring the R-PDCCH transmission resources.

FIG. 12 illustrates an example of dynamically allocating and configuring the R-PDCCH transmission resources.

A method for minimizing an influence on the macro terminal upon allocation of transmission resources is to allocate one or more resource blocks in the PDSCH and transmit the R-PDCCH. In other words, the method is that the R-PDCCH is multiplexed with the backhaul data for the relay station in the frequency domain and transmitted (that is, FDM). Multiplexing the R-PDCCH and the backhaul data in the frequency domain allows resource allocation for the R-PDCCH to be simplified with no influence upon the macro terminal. Further, no special limit applies to the scheduling of the base station in the backhaul and access links and flexibility is maximally guaranteed. However, the FDM method may cause a delay while the relay station decodes the backhaul data. This is why the relay station should receive the R-PDCCH from the whole backhaul downlink subframes in order to start decoding the backhaul data.

Figure 13:
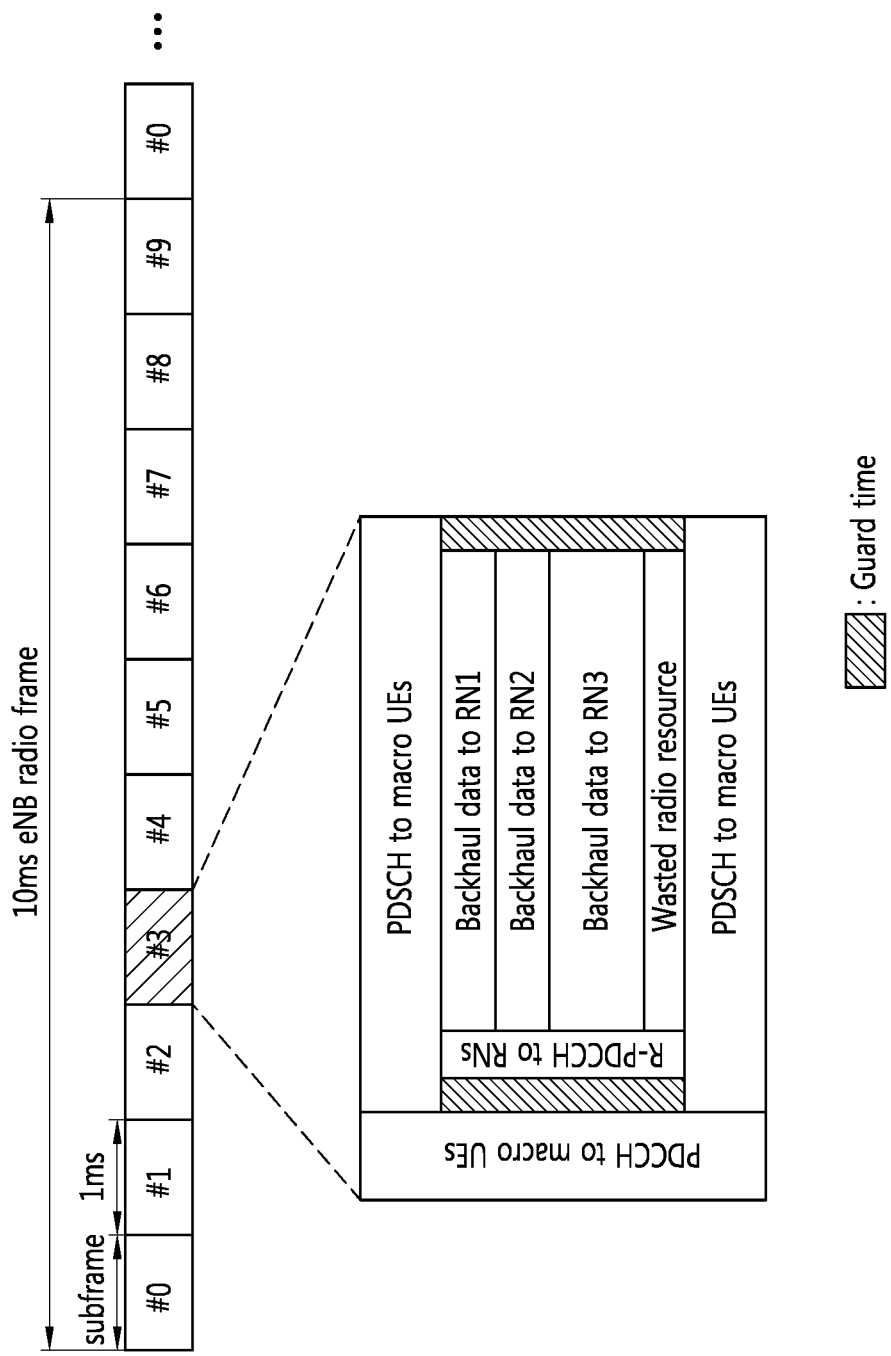
FIG. 13 illustrates another example of the method of dynamically allocating and configuring the R-PDCCH transmission resources.

FIG. 13 illustrates another example of the method of dynamically allocating and configuring the R-PDCCH transmission resources.

There may be a method by which multiplexing is performed in the time domain and an area where the backhaul data is transmitted in order to allocate the R-PDCCH transmission resources as shown in FIG. 13. The base station may previously define a backhaul downlink resource allocated to the relay station, which may be called a "relay zone", and may transmit the backhaul downlink control information and data in the relay zone. In the relay zone, the R-PDCCH and the backhaul data are multiplexed in the time domain. This is the same as the way the existing PDCCH and PDSCH are multiplexed in the time domain. The relay zone for transmission of the R-PDCCH and the backhaul data may be set semi-statically by an upper level signal. In this case, it may be possible to obtain a frequency diversity effect by spreading in the frequency domain an area where the R-PDCCH is transmitted. That is, the R-PDCCH may be transmitted at a larger frequency band than a frequency band at which the R-PDSCH is transmitted. Further, since the R-PDCCH is positioned in the time domain earlier than the area where the backhaul data is transmitted, the decoding may be conducted quickly compared to the FDM method by which the R-PDSSCH should be received from the entire subframes so as to decode the backhaul data. However, such a feature as semi-statically sets the relay zone may limit the scheduling flexibility of the base station and efficient use of the radio resources.

Figure 14:
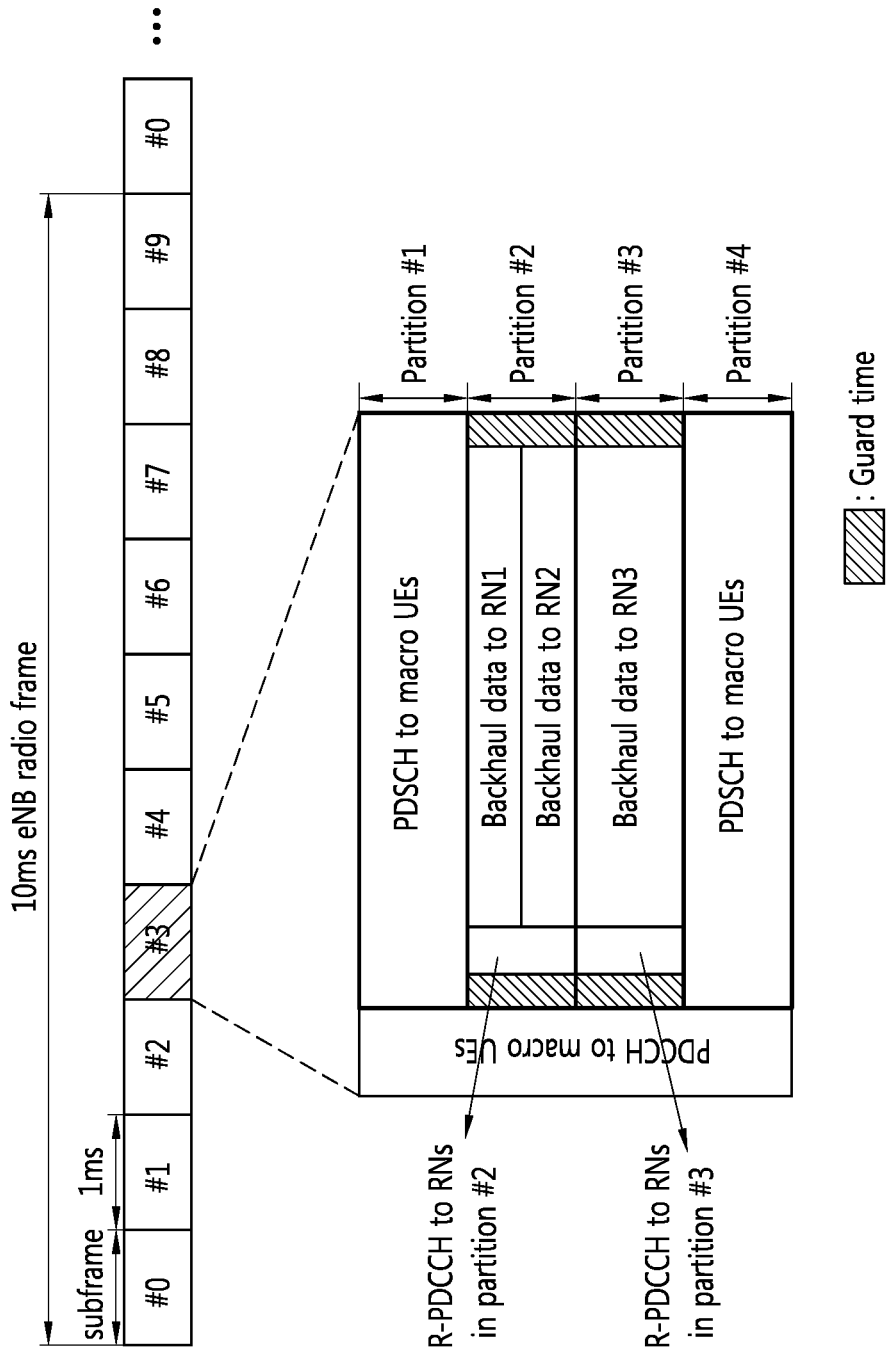
FIG. 14 illustrates another example of the method of dynamically allocating and configuring the R-PDCCH transmission resources.

FIG. 14 illustrates another example of the method of dynamically allocating and configuring the R-PDCCH transmission resources.

The R-PDCCH transmission resources may be dynamically allocated. The dynamic resource allocation may reduce limitation to flexibility and improve a frequency selective scheduling gain. For example, it may be possible to split the whole system band into plural partitions and allocate some of the partitions to the relay station. The partitions may be configured as groups of resource blocks.

The partitions may be used for PDSCH transmission for the macro terminal or may be used for backhaul transmission for the relay station. When the partitions are used for backhaul transmission for the relay station, the R-PDCCH and the backhaul data in the partitions may be multiplexed in the time domain. The base station may dynamically allocate the relay zone by adjusting the number of the partitions allocated for backhaul transmission of the relay station. This method may increase the frequency selective scheduling gain over the method of semi-statically allocating the relay zone. The relay station may be aware of which partition is used for the relay zone by receiving a signal from the base station. For instance, the base station may notify whether each partition is used for the relay zone by performing signaling in the form of bitmap. Or the relay station may find a relay zone allocated thereto by performing blind decoding on each partition.

Figure 15:
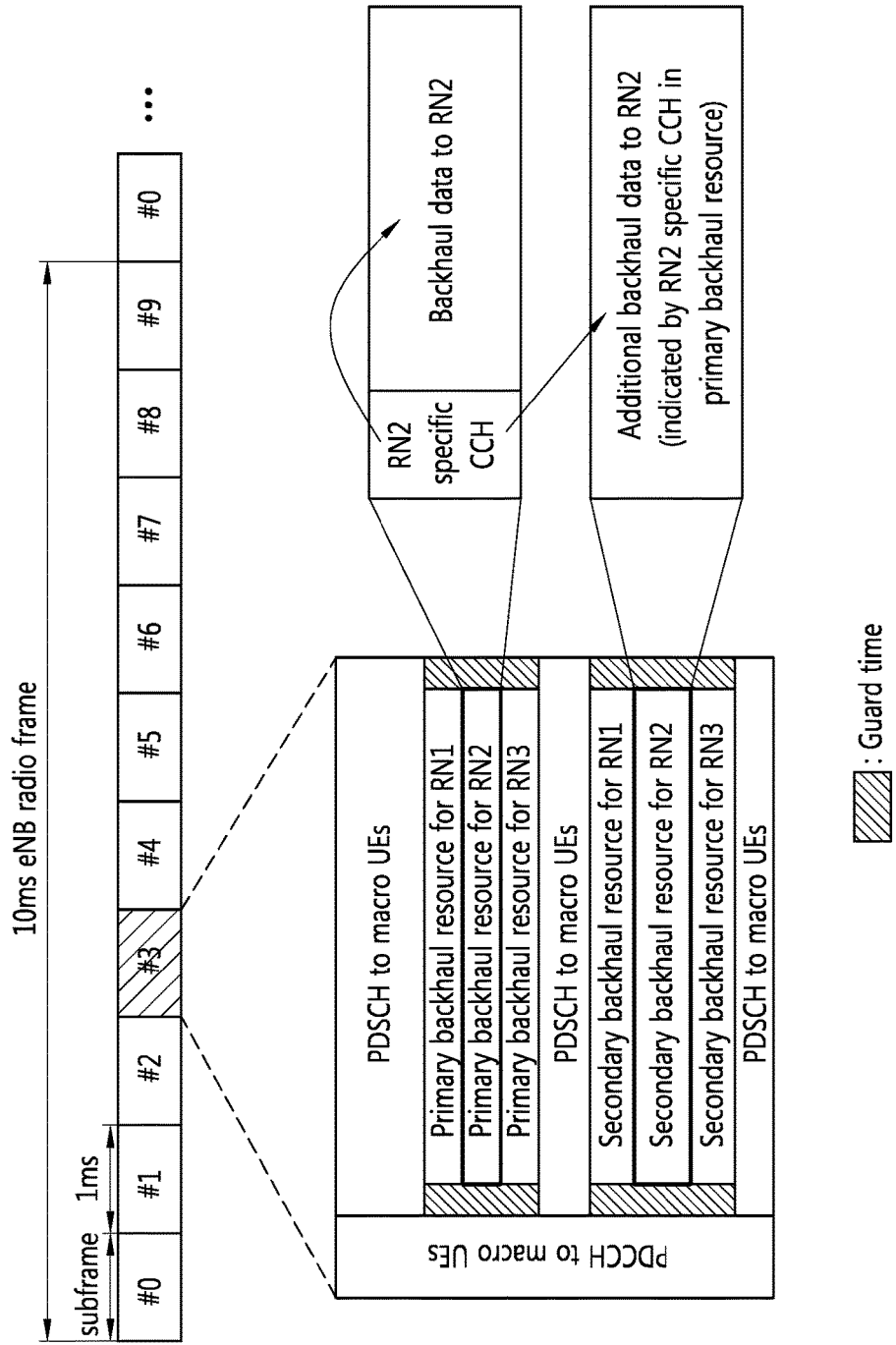
FIG. 15 illustrates still another example of the method of dynamically allocating and configuring the R-PDCCH transmission resources.

FIG. 15 illustrates still another example of the method of dynamically allocating and configuring the R-PDCCH transmission resources (FDM/TDM).

The base station may divide the backhaul downlink resources into two types when allocating the backhaul downlink resources to the relay station. One type is a predetermined resource area predefined for each relay station as primary backhaul resources PBRs. The primary backhaul resources may be minimally allocated. The primary backhaul resources may be allocated to a frequency band which has the best channel state to each relay station and may be changed by an upper level signal. In the primary backhaul resources, a relay station-specific control channel (CCH) is transmitted which may include resource allocation information on the backhaul data transmission band positioned in not only the same frequency band but also a different frequency band. The control channel and backhaul data in the primary backhaul resources are multiplexed in the time domain (TDM).

Another type includes secondary backhaul resources (SBRs). The secondary backhaul resources may be dynamically allocated depending on traffic of the backhaul link. As described above, the relay station-specific control channel included in the primary backhaul resources may resource allocation information on the backhaul data transmission area included in the secondary backhaul resources.

Such a method may apply when in the backhaul link the channel state slowly changes. Or this method eliminates the need for the relay station to find out the R-PDCCH over the entire frequency band in the relay zone and the need of searching for the control channel by blind decoding because of receiving information on the primary backhaul resources and control channel through the upper level signal.

Figure 16:
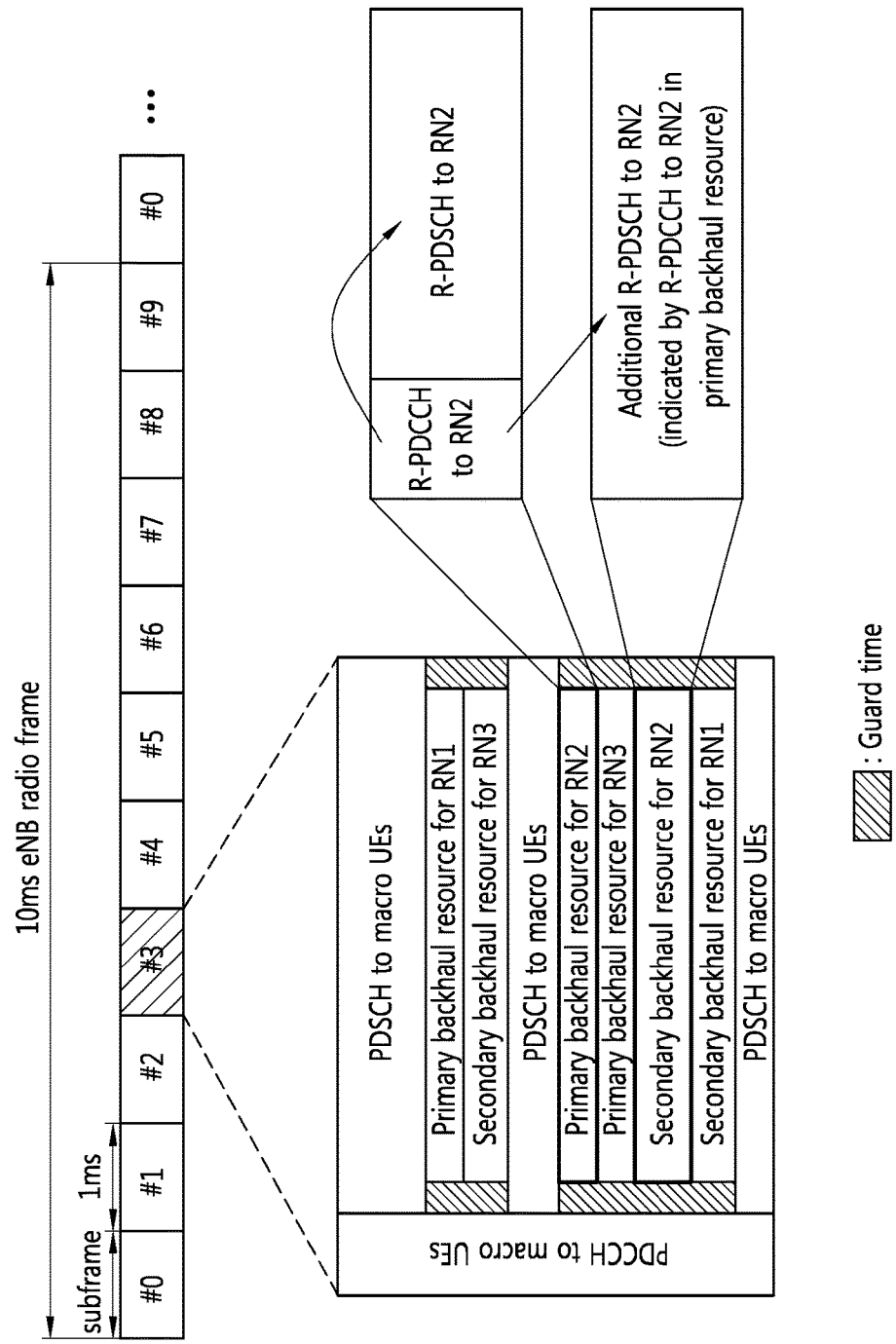
FIG. 16 illustrates an example of dynamically or semi-statically allocating and configuring the R-PDCCH transmission resources.

FIG. 16 illustrates an example of dynamically or semi-statically allocating and configuring the R-PDCCH transmission resources.

For allocating the backhaul downlink resources to the relay station, the base station may distinguish the backhaul downlink resources into two types. One type includes primary backhaul resources (PBRs) which correspond to a resource area allocated to each relay station in a semi-static or dynamic manner. The relay station-specific R-PDCCH is transmitted to the first one or more OFDM symbols in the primary backhaul resources. OFDM symbols subsequent to OFDM symbols to which the R-PDCCH is allocated are used for R-PDSCH transmission.

In the case that a channel between the base station and the relay station changes slowly, the primary backhaul resources may be allocated in a semi-static manner. In such case, the PBR is semi-statically allocated by an upper level signal and may obtain a dependent scheduling gain and low search complexity of the R-PDCCH. On the contrary, in the case that the channel condition is unstable and changes fast, the primary backhaul resources may be allocated in a dynamic manner. In such case, the relay station may search the PBR through blind decoding. Because not being able to the location of the allocated PBR, the relay station performs search on the PBR in a predetermined search space. In the case of dynamically allocating the primary backhaul resources, the base station may perform the PDSCH transmission scheduling on the macro terminal with the maximum flexibility. The primary backhaul resources may be allocated for each relay station to the frequency band (resource blocks) having the best channel condition.

The other type includes secondary backhaul resources (SBRs). The secondary backhaul resources may be additionally allocated depending on traffic of the backhaul link. The R-PDSCH may be transmitted in the secondary backhaul resources. The secondary backhaul resources may be indicated by the R-PDCCH located in the primary backhaul resources.

Figure 17:
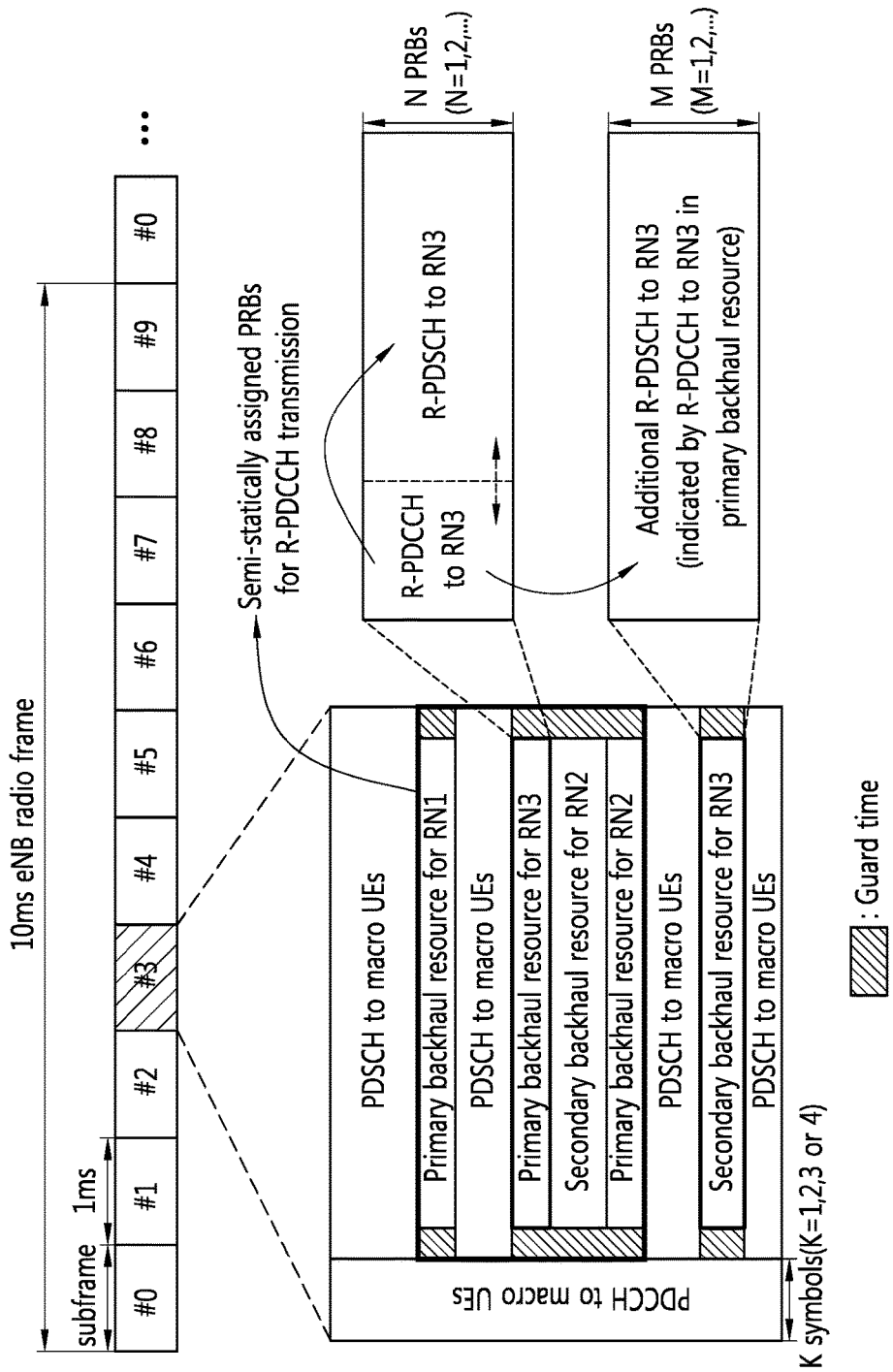
FIG. 17 illustrates another example of dynamically or semi-statically allocating and configuring the R-PDCCH transmission resources.

FIG. 17 illustrates another example of dynamically or semi-statically allocating and configuring the R-PDCCH transmission resources.

For allocating the backhaul downlink resources to the relay station, the base station may distinguish the backhaul downlink resources into two types. One type includes primary backhaul resources (PBRs) which are allocated to each relay station in a dynamic or semi-static manner. In the primary backhaul resources, the R-PDCCH may be transmitted with a varying start location on the contrary to that shown in FIG. 16. For example, the R-PDCCH may be transmitted in the first one or more predetermined numbers of OFDM symbols of the primary backhaul resources but at a different OFDM location. As such, the fact that the start location of the R-PDCCH in the primary backhaul resources varies differs from the example described in connection with FIG. 16. OFDM symbols subsequent to OFDM symbols to which the R-PDCCH is allocated are used for R-PDSCH transmission and OFDM symbols that come before the OFDM symbols to which the R-PDCCH is allocated are used for transmission of the PDSCH for the macro terminal.

In the case that a channel between the base station and the relay station changes slowly, the primary backhaul resources may be allocated in a semi-static manner. In such case, the PBR may be semi-statically allocated by an upper level signal and obtain a channel-dependent scheduling gain and reduce search complexity of the R-PDCCH. On the contrary, in the case that the channel characteristics are not stable and change fast, the primary backhaul resources may be allocated in a dynamic manner. In such case, the relay station may search the PBR through blind decoding. Because of not being able to the location of the allocated PBR, the relay station searches the PBR in a predetermined search space (PRB for transmission of the R-PDCCH semi-statically set). In the case that the base station dynamically allocates the frequency selective PBR, the related R-PDSCH may be allocated to the same PBR. In the case that the base station dynamically allocates the primary backhaul resources, the base station may perform PPDSCH transmission scheduling for the macro terminal with the maximum flexibility. The primary backhaul resources may be allocated for each relay station to a frequency band (resource blocks) having the best channel condition.

The other type includes the secondary backhaul resources (SBRs). The secondary backhaul resources may be additionally allocated depending on traffic of the backhaul link. In the secondary backhaul resources, the R-PDSCH may be transmitted. The secondary backhaul resources may be indicated by the R-PDCCH located in the primary backhaul resources.

The backhaul resource allocation methods described in connection with FIGS. 11 to 17 describe transmission resource allocation mainly for the R-PDCCH and R-PDSCH. In such backhaul resource allocation methods, transmission resource allocation of the R-PCFICH and R-PHICH may be performed in the R-PDCCH transmission resources or R-PDSCH transmission resources. Hereinafter, if otherwise stated, methods of setting transmission modes for the R-PCFICH and R-PHICH and applying reference signals used for demodulation/decoding based on the set transmission modes may be defined in the same way as those that have applied to the R-PDCCH.

Various transmission modes may apply to the backhaul downlink (or backhaul uplink). For instance, the transmission modes may include a single antenna transmission mode, a transmit diversity based on plural antennas, a rank 1 single codeword precoding transmission, closed loop precoding base space multiplexing, or open loop precoding base space multiplexing. One or more of the transmission modes may apply to the backhaul downlink depending on the channel. The transmit diversity is a transmission mode that increases reliability by transmitting the same data through plural transmission antennas. The space multiplexing is a transmission mode that may perform high rate data transmission without increasing the bandwidth of the system by transmitting different data through plural transmission antennas. The closed loop precoding is a transmission mode in which the base station determines the precoding vector/matrix using channel information (e.g., PMI) fed back from the receiving terminal, and the open loop precoding is a transmission mode in which the base station determines the precoding vector/matrix without respect to channel information fed back from the receiving terminal.

In the case that the base station transmits the R-PDCCH, transmission modes applicable to the R-PDCCH and methods of applying reference signals applicable to demodulation and decoding of the R-PDCCH are as follows. At this time, the transmission modes of the R-PDSCH and the methods of applying the reference signals are the same as the methods applying to the R-PDCCH or may be defined by rank values (i.e., the number of transmission layers or the number of transmission streams) configured by the relay station-specific RRC signaling and the precoding vector/matrix. Likewise, the transmission mode of the R-PDCCH and methods of applying the reference signals and their related rank values and designation of the precoding vector/matrix may be configured to be performed by the base station based on the relay station-specific RRC signaling.

TABLE 3

| Case | R-PDCCH transmission mode | Reference signal for demodulation/decoding | Detailed characteristics |
| --- | --- | --- | --- |
| Case-0 | Single antenna transmission or transmit diversity using M transmission antenna ports (M = 1, 2, or 4) | Cell specific RS (CRS) conventionally defined in LTE release 8/9 (M antenna ports in backhaul link) | |
| Case-1 | Single antenna transmission or transmit diversity using M transmission antenna ports (M = 1, 2, 4 or 8) | New cell specific and relay station common RS (M antenna ports may be defined in given OFDM symbol area) | |

TABLE 3-continued

| Case | R-PDCCH transmission mode | Reference signal for demodulation/decoding | Detailed characteristics |
|---|---|---|---|
| Case-2 | Precoded transmit diversity using R virtual antenna ports (R = 1, 2, or 4) | R precoded (virtualized) relay station specific DM-RS patterns | Applied precoder may be preset or predefined by RRC signal or L1/L2 control signal signaling |
| Case-3 | Rank 1 closed loop precoding based transmission using M transmission antenna ports (M = 2, 4, or 8) | Case-3.1: New cell specific and relay station common RS (M antenna ports may be defined in given OFDM symbol area) Case-3.2: Cell specific RS (CRS) conventionally defined in LTE release 8/9 (M antenna ports in backhaul link) | |
| Case-4 | Rank 1 closed loop precoding based transmission using M transmission antenna ports (M = 2, 4, or 8) | layer #P pattern precoded DM-RS for R-PDSCH demodulation (P = 0, 1, 2, 3, 4, 5, 6, 7, or 8; e.g. P = 0 or 1) | Applied precoded DM_RS layer pattern may use the same precoder as precoder used for R-PDCCH transmission |
| Case-5 | Rank 1 open loop precoding based transmission using M transmission antenna ports (M = 2, 4, or 8) | Case-5.1: New cell specific and relay station common RS (M antenna ports may be defined in given OFDM symbol area) Case-5.2: Cell specific RS (CRS) conventionally defined in LTE release 8/9 (M antenna ports in backhaul link) | Precoder-cycling may apply to R-PDCCH (Q subcarrier level, where Q is a positive integer) |
| Case-6 | Rank 1 open loop precoding based transmission using M transmission antenna ports (M = 2, 4, or 8) | layer #P pattern precoded DM-RS for R-PDSCH demodulation (P = 0, 1, 2, 3, 4, 5, 6, 7, or 8; e.g. P = 0 or 1) | Precoder cycling may be used for R-PDCCH and reference signal (Q subcarrier level, where Q is a positive integer) precoded DM-RS layer pattern may use the same precoder as precoder for R-PDCCH transmission |
| Case-7 | Transmission mode the same as R-PDSCH: closed loop spatial multiplexing | Precoded DM-RS pattern for R-PDSCH demodulation | |
| Case-8 | Transmission mode the same as R-PDSCH: open loop spatial multiplexing | Precoded DM-RS pattern for R-PDSCH demodulation | |
| Case-9 | Closed loop precoding based transmission using M transmission antenna ports (M = 2, 4, or 8) | Case-9.1: New cell specific and relay station common RS (M antenna ports may be defined in given OFDM symbol area) Case-9.2: Cell specific RS (CRS) conventionally defined in LTE release 8/9 (M antenna ports in backhaul link) | |
| Case-10 | Rank 2 closed loop precoding based transmission for M transmission antenna ports (M = 2, 4, or 8) | Predetermined or given two layer patterns C, D of precoded DM-RS for R-PDSCH demodulation (C ≠ D, C or D = 0, 1, 2, 3, 4, 5, 6, 7, or 8; e.g. C = 0 and D = 1) | Precoded DM-RS level pattern may use the same precoder as precoder for R-PDCCH transmission |

TABLE 3-continued

| Case | R-PDCCH transmission mode | Reference signal for demodulation/decoding | Detailed characteristics |
|---|---|---|---|
| Case-11 | Rank 2 open loop precoding based transmission for M transmission antenna ports (M = 2, 4, or 8) | Case-11.1: New cell specific and relay station common RS (M antenna ports may be defined in given OFDM symbol area) Case-11.2: Cell specific RS (CRS) conventionally defined in LTE release 8/9 (M antenna ports in backhaul link) | Precoder cycling may be used for R-PDCCH (Q subcarrier level, where Q is a positive integer) |
| Case-12 | Rank 2 open loop precoding based transmission for M transmission antenna ports (M = 2, 4, or 8) | Predetermined or given two layer patterns C, D of precoded DM-RS for R-PDSCH demodulation (C ≠ D, C or D = 0, 1, 2, 3, 4, 5, 6, 7, or 8; e.g. C = 0 and D = 1) | Precoder cycling may be used for R-PDCCH and reference signal (Q subcarrier level, where Q is a positive integer) precoded DM-RS layer pattern may use the same precoder as precoder for R-PDCCH transmission |

In the above-described cases, a cell-specific and relay station-common reference signal may be defined for demodulation and decoding of R-PDCCH (this will be described below with reference to FIGS. 24 to 26). As the case may be, OFDM symbols defining the new reference signal may be designated. In the case that a precoded reference based transmission mode applies to the R-PDSCH, a transmission mode designated by scheduling information for transmission in the frequency transmission resource designated by scheduling and a precoded reference signal precoded by its related precoding vector are used for demodulation and decoding of R-PDSCH. On the contrary, for R-PDCCH, a new cell-specific and relay station-common reference signal may be used. Accordingly, the R-PDCCH and R-PDSCH may perform demodulation and decoding using different reference signals. That is, different forms or different numbers of reference signals may be used in the R-PDCCH area and R-PDSCH area.

Figure 18:
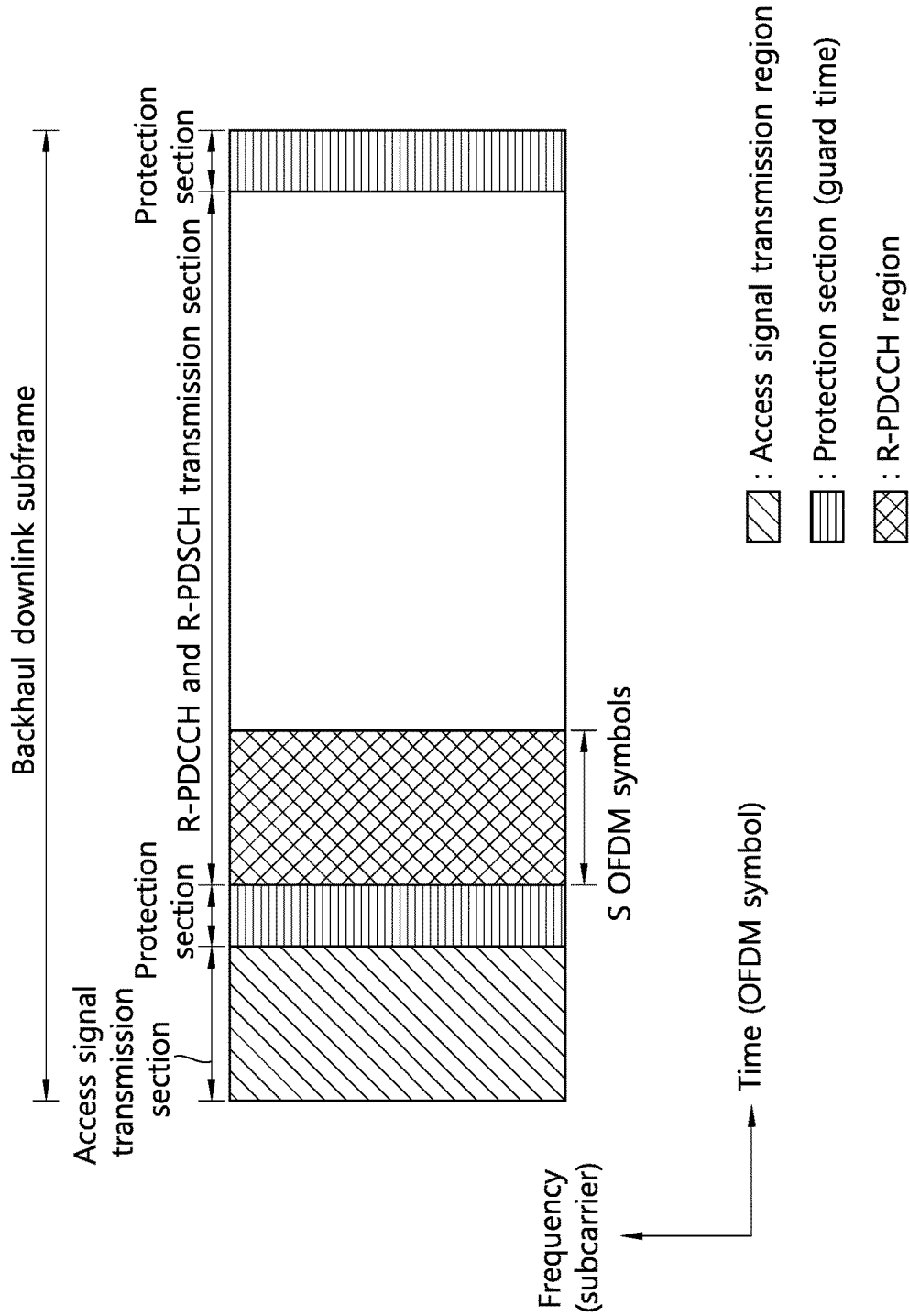
FIG. 18 illustrates an example of allocating cell-specific and relay station-common reference signal patterns to an area in which the R-PDCCH is transmitted in the backhaul downlink subframe.

FIG. 18 illustrates an example of allocating cell-specific and relay station-common reference signal patterns to an area in which the R-PDCCH is transmitted in the backhaul downlink subframe.

The backhaul subframe includes an access signal transmission section, a protection section, and a backhaul receiving section. In the backhaul receiving section, R-PDCCH and R-PDSCH are received. The R-PDCCH and R-PDSCH may be multiplexed in the backhaul receiving section of the backhaul downlink subframe in any frequency resource area. In this circumstance, M cell-specific and relay station-common reference signals (hereinafter, "R-PDCCH reference signals") patterns may be allocated in S OFDM symbol sections of the backhaul downlink subframe, where S is a natural number between 1 and 6. The S OFDM symbols are shown as consecutive OFDM symbols in FIG. 18, but the present invention is not limited thereto. The S OFDM symbols may be spaced apart from each other or a plurality of OFDM symbols may be grouped so that the groups of symbols may be spaced apart from each other.

Further, the locations of the S OFDM symbols used for R-PDCCH transmission in the backhaul downlink subframe may be fixed. In this case, an offset may be located on a per-OFDM symbol basis between the protection section and a symbol from which R-PDCCH transmission begins. The OFDM symbol(s) over the offset may be used for transmission of physical signals such as reference signal, transmission of physical control channels or R-PDSCH transmission.

The R-PDCCH reference signal may be used for demodulation and decoding of the R-PDCCH. The physical resource mapping of the R-PDCCH reference signal may be performed using one of methods to be described below.

First embodiment: M (1) cell-specific and relay station-common reference signal detailed patterns for R-PDCCH demodulation and decoding which are newly defined over the S OFDM symbols may be defined in the R-PDCCH transmission resource area set semi-statically and mapped to the physical resources. The R-PDCCH transmission resource area may include basic units having consecutive frequency resources in the frequency domain. That is, the R-PDCCH transmission resource area may include plural basic units in the frequency domain wherein the basic unit is the granularity. For such basic units, fixed reference patterns may be defined. For example, in the case that the R-PDCCH transmission resource area is set so that the basic unit is a PRB (Physical Resource Block), the reference signal patterns for R-PDCCH demodulation and decoding may be fixed and defined on a per-PRB basis.

Second embodiment: M (1) cell-specific and relay station-common reference signal detailed patterns for R-PDCCH demodulation and decoding which are defined over the S OFDM symbols may be defined in the entire system band or a frequency band set semi-statically (or statically) and mapped to physical resources. The entire system band may be defined as a single component carrier band or a band which is a combination of plural component carriers.

The M R-PDCCH reference signal patterns may be patterns that are mapped with the physical resources (for example, resource elements or subcarriers) fixed on a per-PRB basis. The base station may map the PDSCH data modulation symbols to resource elements other than resource elements mapped with the R-PDCCH reference signal patterns in the rate matching form in the band at which the PDSCH is transmitted among the entire system band. The LTE-A terminal may conduct demodulation and decoding on resource elements mapped with the PDSCH data modulation symbols. In the band at which the PDSCH is transmitted among the entire system band, the base station may puncture the resource elements mapped with the R-PDCCH reference signal patterns and then transmit the punctured resource elements. The legacy terminal (LTE terminal) may perform decoding without recognizing whether the resource elements mapped with the R-PDCCH reference signal patterns are punctured.

In the above example, the section of S OFDM symbols may be defined to have the same number as the number of the OFDM symbols in which the R-PDCCH is transmitted or the R-PDCCH transmission symbol index. However, as the case may be, the section of S OFDM symbols may be defined differently. For example, the number of the OFDM symbols in which the R-PDCCH is transmitted may be more than S. Such setting may be made to be specific to the cell or relay station. The number of the OFDM symbols in which the R-PDCCH is transmitted may be set to have a value less than S.

The method described in connection with FIG. 18 (for example, the description on the R-PDCCH reference signal patterns) may also apply to configuring the R-PDCCH as described in connection with FIGS. 11 to 17.

Hereinafter, each case in Table 3 is described in greater detail.

1. Case-0

In Case-0, the base station uses single antenna transmission or transmit diversity adopting M (M=1, 2, or 4) transmission antenna ports in the R-PDCCH transmission mode and uses a cell specific reference signal (CRS, common reference signal) that is defined in the conventional LTE release 8/9 as the R-PDCCH reference signal.

Figure 19:
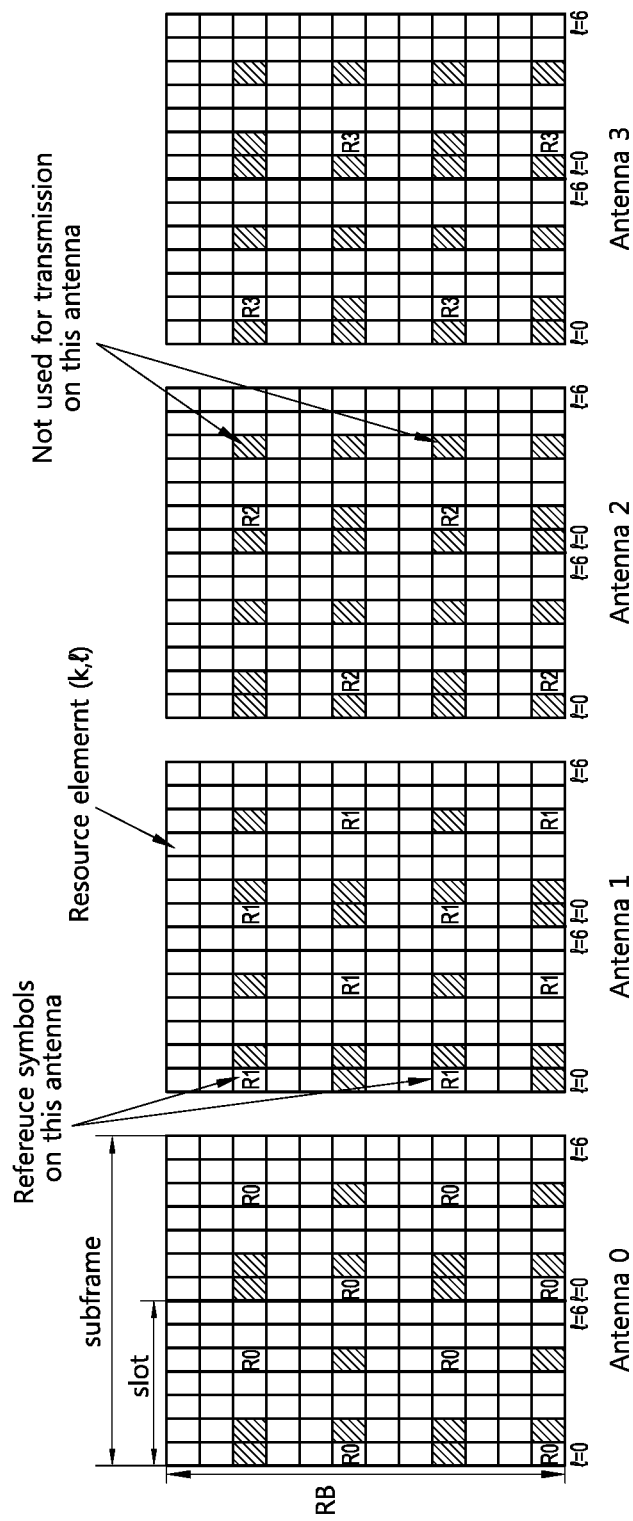
FIG. 19 illustrates an example of a cell specific reference signal for four antenna ports in the subframe to which the normal CP applies.
Figure 20:
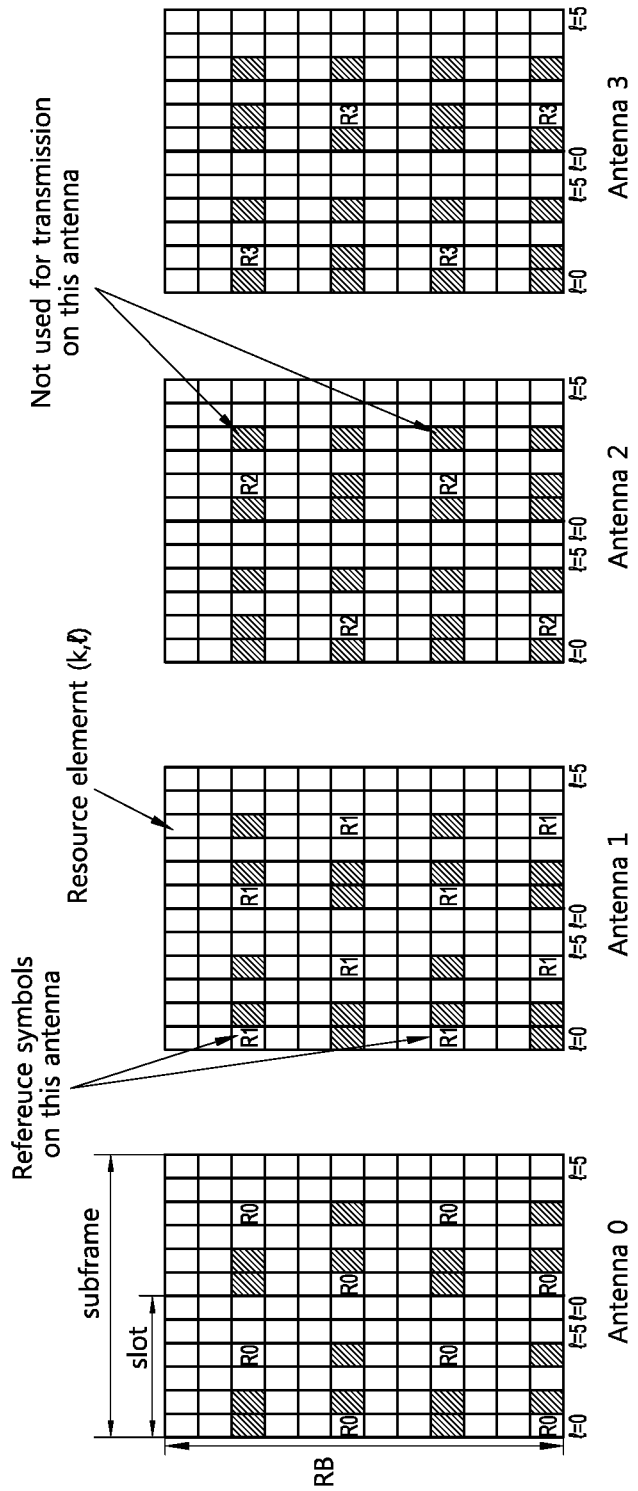
FIG. 20 illustrates an example of a cell specific reference signal for four antenna ports in the subframe to which the extended CP applies.

FIG. 19 illustrates an example of a cell specific reference signal for four antenna ports in the subframe to which the normal CP applies. FIG. 20 illustrates an example of a cell specific reference signal for four antenna ports in the subframe to which the extended CP applies. The resource elements marked with RX in FIGS. 19 and 20 refer to reference signal resource elements for antenna ports #X (X=0, 1, 2, or 3). FIGS. 19 and 20 illustrate examples of the conventional cell specific reference signals. See section.6.10.1 in 3GPP TS 36.211 V8.4.0 (2008-09) Technical Specification Group Radio Access Network; Evolved Universal Terrestrial Radio Access (E-UTRA); Physical Channels and Modulation (Release 8). Hereinafter, the conventional cell specific reference signal may refer to the reference signal shown in FIGS. 19 and 20.

The relay station may use part of the conventional cell specific reference signal in the case of demodulating and decoding the R-PDCCH. The relay station may use the conventional cell specific reference signal as the R-PDCCH reference signal. In the case that the base station transmits the R-PDCCH using one, two, or four antenna ports, the relay station performs demodulating and decoding using the conventional cell specific reference signal included in the S OFDM symbol area. Specifically, when the base station transmits the R-PDCCH using antenna port #0 and antenna port #1, the relay station may use the reference signal resource elements arranged in the fifth OFDM symbol of the first slot and the first and fifth OFDM symbols of the second slot in the backhaul subframe. When the base station transmits the R-PDCCH using antenna ports #2 and #3, the relay station may additionally use the reference signal resource elements arranged in the second OFDM symbol of the second slot in the backhaul subframe.

Table 4 below represents exemplary antenna ports applying according to M.

TABLE 4

| Value of M | Antenna port indices |
| --- | --- |
| 1 | Conventional cell specific reference signal antenna port #0 (Legacy CRS antenna port #0) |
| 2 | Conventional cell specific reference signal antenna ports #0 and #1(Legacy CRS antenna port #0 and #1) |
| 4 | Conventional cell specific reference signal antenna ports #0, #1, #2, #3 (Legacy CRS antenna port #0, #1, #2, and #3) |

In the backhaul downlink subframe, depending on the R-PDCCH transmission area (OFDM symbol area) set cell-specifically or relay station-specifically, the OFDM symbol range of the conventional cell specific reference signals (hereinafter, "CRS") used for demodulation/decoding of R-PDCCH may be determined. For example, 1) the R-PDCCH transmission area may include only the fifth OFDM symbol of the first slot, or 2) may include the fifth OFDM symbol of the first slot to the first or second OFDM symbol of the second slot. In the case that M=2, regarding 1) above, the relay station may conduct demodulation/decoding of the R-PDCCH using only CRS antenna ports #0 and #1 mapped with the fifth OFDM symbol of the first slot. Or regarding 2), the relay station may demodulate/decode the R-PDCCH using the CRS antenna ports #0 and #1 mapped with the fifth OFDM symbol of the first slot and the first OFDM symbol of the second slot.

In the case that M=4, the relay station may demodulate/decode the R-PDCCH using the CRS antenna ports #0 and #1 mapped with the fifth OFDM symbol of the first slot and the first OFDM symbol of the second slot and the CRS antenna ports #2 and #3 mapped with the second OFDM symbol of the second slot.

Transmit diversity schemes applicable by the base station include CDD (Cyclic Delay Diversity), PVS (precoding vector switching), STBC(Space Time Block Code), SFBC (Space Frequency Block Code), SFBC+FSTD (frequency switched transmit diversity), SFBC+CDD, STBC+FSTD, STBC+CDD, STBC+PVS, and so forth, and depending on M, may use other schemes. The CCD obtains a diversity gain using each path delay between transmission antennas. The PVS is a sort of transmit diversity scheme and obtains a random beam-forming gain by switching precoding vectors (weight) on a per-constant time, slot, or symbol basis. The SFBC efficiently applies selectivity in the spatial domain and frequency domain to secure both diversity gain and multiple user scheduling gain in the corresponding domain. The STBC applies selectivity in the spatial domain and time domain. The FSTD distinguishes signals transmitted over multiple antennas for each frequency.

The number of R-PDCCH reference signal patterns for antenna ports used for the R-PDCCH may be defined to be the same as the number of transmission antennas included in the base station. Or in consideration of the fact that the reference signal overhead of the backhaul downlink transmission or the number of applicable reference signal patterns may be set depending on the form of the backhaul downlink subframe, a less number of R-PDCCH reference signal patterns than the number of the transmission antennas included in the base station may be defined.

In the case that a less number of R-PDCCH reference signal patterns than the number of the transmission antennas in the base station are defined, the base station may use the antenna virtualization scheme for both data and the reference signals. The "antenna virtualization" refers to a scheme that allows signals to appear to be transmitted through antennas whose number is different from the number of actual transmission antennas at the reception end. In other words, this scheme implements transmission by setting the number of physical transmission antennas owned by the actual base station different from the number of virtual antennas (or the number of antenna ports) applied for the transmitter. At this time, a virtual antenna matrix for purposes of antenna virtualization is generally configured as (No. of physical transmission antennas) X (No. of virtual antennas).

For example, the reference signal sequence #i ($r_i(m)$) may be formed to be mapped with virtual antenna #i. At this time, a virtual antenna matrix V may be used to map the reference signal sequence #i ($r_i(m)$) with virtual antenna #i.

The number of the rows in the virtual antenna matrix may be the same as the number of the physical transmission antennas, and the number of columns in the virtual antenna matrix may be the same as the number of the virtual antennas. In the case that the reference signal for the terminal is transmitted in a virtual antenna mapping process, Nt (No. of the physical transmission antennas) virtual antennas may be configured. In this circumstance, the size of the virtual antenna matrix is Nt×Nt.

Equation 1 represents an example of the virtual antenna matrix where Nt is 8:

$$V = (v_0 \; v_1 \; \cdots \; v_7) = \begin{pmatrix} v_{00} & v_{10} & \cdots & v_{70} \\ v_{01} & v_{11} & \cdots & v_{71} \\ \vdots & \vdots & \ddots & \vdots \\ v_{07} & v_{17} & \cdots & v_{77} \end{pmatrix} \quad \text{Equation 1}$$

Here, $v_i$ refers to the virtual antenna vector #i for mapping the reference signal with the virtual antenna #i by the ith column vector in the virtual antenna matrix. $v_{ij}$ refers to a complex coefficient of the virtual antenna matrix (i∈{0, 1, ..., 7}, j∈{0, 1, ..., 7}). The complex coefficient may be configured in various forms depending on the situation.

The virtual antenna matrix may be configured as a unitary matrix. In the case that the virtual antenna matrix is a unitary matrix, electric power may be distributed evenly to all of the transmission antennas.

The reference signal sequence vector #i in which the reference signal sequence #i is mapped with the virtual antenna #i may be represented as in Equation 2:

$$R_i(m) = v_i * r_i(m), \; i=0, \ldots, 7 \quad \text{Equation 2}$$

Here, $r_i(m)$ refers to the reference signal sequence #i, $v_i$ the virtual antenna vector #i as the i th column vector in the virtual antenna matrix, and $R_i(m)$ the reference signal sequence vector #i.

The transmitter may transmit the reference signal sequence vector #i($R_i(m)$) through Nt transmission antennas and the receiver may receive receiving signal vector $y=[y_1 \; y_2 \; \ldots \; y_{Nr}]^T$ through Nr receiving antennas. The receiving signal vector y may be represented as in Equation 3:

$$y = Hv_i r_i(m) + n \quad \text{Equation 3}$$
$$= h_i r_i(m) + n$$

Here, $n=[n_1 \; n_2 \; \ldots \; n_{Nr}]^T$ is a noise vector.

The receiver is formed to estimate the virtual antenna channel #i($h_i$) that is a virtual antenna channel for the virtual antenna #i from the receiving signal vector. The receiver may estimate the virtual antenna channel #i($h_i$) because of being aware of the reference signal sequence #i($r_i(m)$).

Although illustrated herein is an example where one reference signal sequence is transmitted through one virtual antenna, K reference signal sequences may be transmitted through K virtual antennas. In the case that transmission through K antennas applies to any receiver, the transmitter may configure Nt virtual antennas and select K virtual antennas to transmit the reference signals.

Based on respective K reference signal sequences and respective K virtual antenna vectors, respective K reference signal sequence vectors are generated that may be transmitted through Nt transmission antennas. Here, the respective K virtual antenna vectors may be different column vectors that are selected from the virtual antenna matrix. For instance, when the virtual antenna matrix is an 8×8 matrix, the K virtual antenna vectors are configured as K column vectors in the 8×8 matrix and the virtual antenna matrix applying to the K virtual antennas may be an 8×K matrix.

The virtual antenna matrix may use the same virtual antenna matrix without respect to K. Or different antenna matrixes may be used depending on K. For instance, the base station may, for the terminal, use the same virtual antenna matrix or different virtual antenna matrixes depending on 1, 2, or 4 antenna transmission.

Hereinafter, a specific example of the virtual antenna matrix is described.

1. In case that eight virtual antennas are configured and four virtual antennas are selected In the case that four antenna transmission applies to the receiver, the transmitter may transmit the reference signals by configuring eight virtual antennas and selecting four virtual antennas. In this case, the following virtual antenna matrix may be configured.

Equation 4 is an example of the virtual antenna matrix:

$$V = (v_0 \; v_1 \; \cdots \; v_7) = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{pmatrix} \quad \text{Equation 4}$$

In this case, the virtual antenna vector is fixed irrespective of the location of the time-frequency resources. Regardless of the time-frequency resources, a specific beam is formed. Here, the time-frequency resources may include subcarriers, resource elements, or specific resources.

Equation 5 is another example of the virtual antenna matrix:

$$V = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ \exp(jd_1 k) & 0 & 0 & 0 & -\exp(jd_1 k) & 0 & 0 & 0 \\ 0 & \exp(jd_2 k) & 0 & 0 & 0 & -\exp(jd_2 k) & 0 & 0 \\ 0 & 0 & \exp(jd_3 k) & 0 & 0 & 0 & -\exp(jd_3 k) & 0 \\ 0 & 0 & 0 & \exp(jd_4 k) & 0 & 0 & 0 & -\exp(jd_4 k) \end{pmatrix} \quad \text{Equation 5}$$

Here, k refers to the time-frequency resource index indicating the time-frequency resource, and di the phase ($0 \leq d_i < 2\pi$, i=1, 2, 3, 4). For example, k may be a subcarrier index, resource element index, or specific resource index. Depending on the time-frequency resources, the beam may be formed.

A different type of matrix may be used as the virtual antenna matrix. For example, the virtual antenna matrix may be a combination of a phase diagonal matrix and a constant modulus matrix. The constant modulus matrix is a matrix in which each element in the matrix has same magnitude that is not '0'. For example, the constant modulus matrix U may be a DFT (Discrete Fourier Transform) matrix or Walsh matrix. For instance, the virtual antenna matrix may be represented as in Equation 6:

$$V = \begin{pmatrix} \exp(jd_0 k) & 0 & 0 & 0 & 0 & 0 & 0 & 0 \\ 0 & \exp(jd_1 k) & 0 & 0 & 0 & 0 & 0 & 0 \\ 0 & 0 & \exp(jd_2 k) & 0 & 0 & 0 & 0 & 0 \\ 0 & 0 & 0 & \exp(jd_3 k) & 0 & 0 & 0 & 0 \\ 0 & 0 & 0 & 0 & \exp(jd_4 k) & 0 & 0 & 0 \\ 0 & 0 & 0 & 0 & 0 & \exp(jd_5 k) & 0 & 0 \\ 0 & 0 & 0 & 0 & 0 & 0 & \exp(jd_6 k) & 0 \\ 0 & 0 & 0 & 0 & 0 & 0 & 0 & \exp(jd_7 k) \end{pmatrix} U \quad \text{Equation 6}$$

Here, matrix U is a constant modulus matrix, k the time-frequency resource index indicating the time-frequency resource, and $d_i$ the phase ($0 \leq d_i < 2\pi$, i=0, 1, ..., 7). The constant modulus matrix may be a unitary matrix in which each element in the matrix has the same magnitude. k may be a subcarrier index, resource element index, or specific resource index.

In the case that phase $d_i$ is '0' (i=0, 1, ..., 7), the virtual antenna matrix V becomes U. Phase $d_i$ may use a fixed value or may be determined by the base station (i=0, 1, ..., 7).

In case that eight virtual antennas are configured and two virtual antennas are selected.

In the case that two antenna transmission applies to the receiver, the transmitter may configure eight virtual antennas and select two virtual antennas to transmit the reference signals. In this case, the following virtual antenna matrix may be configured.

Equation 7 is an example of the virtual antenna matrix:

$$V = (v_0 \; v_1 \; \cdots \; v_7) = \begin{pmatrix} 1 & 0 & 1 & 0 & 1 & 0 & 1 & 0 \\ 0 & 1 & 0 & 1 & 0 & 1 & 0 & 1 \\ 1 & 0 & j & 0 & -1 & 0 & -j & 0 \\ 0 & 1 & 0 & j & 0 & -1 & 0 & -j \\ 1 & 0 & -1 & 0 & 1 & 0 & -1 & 0 \\ 0 & 1 & 0 & -1 & 0 & 1 & 0 & -1 \\ 1 & 0 & -j & 0 & -1 & 0 & j & 0 \\ 0 & 1 & 0 & -j & 0 & -1 & 0 & j \end{pmatrix} \quad \text{Equation 7}$$

The virtual antenna matrix may be configured by expanding the DFT matrix or Walsh matrix. For instance, the virtual antenna matrix may be represented as in Equation 8:

$$V = (v_0 \; v_1 \; \cdots \; v_7) = \begin{pmatrix} D_{4\times 4} & 0 \\ 0 & D_{4\times 4} \end{pmatrix} \text{ or } \begin{pmatrix} W_{4\times 4} & 0 \\ 0 & W_{4\times 4} \end{pmatrix} \quad \text{Equation 8}$$

Here, $D_{4\times 4}$ is a 4×4 DFT matrix, and $W_{4\times 4}$ is a 4×4 Walsh matrix. As such, the virtual antenna matrix may be configured by expanding the DFT matrix or Walsh matrix in the block diagonal form. As such, the virtual antenna matrix may be configured differently depending on the number of transmission antennas supported by the transmitter. Or one or more virtual antenna matrixes for a specific number (e.g., 1, 2, or 4) of transmission antennas may be configured. In such circumstances, different virtual antenna matrix may be used depending on the transmission scheme, subframe, radio frame, or the like.

Or the base station may transmit the R-PDCCH by setting the number of virtual antennas or physical antennas used for transmission equal to the number (M) of the R-PDCCH reference signals. M may be set by the cell specific and relay station common RRC signaling or by the system information, or may be set by L1/L2 control information signaling.

M may be set differently for each relay station or each group of relay stations. At this time, M may be set by the relay station specific RRC signaling or L1/L2 control information signaling.

2. Case-1

In Case-1, the base station uses single antenna transmission or transmit diversity adopting M (M=1, 2, 4, or 8) transmission antenna ports as the R-PDCCH transmission mode and uses as the R-PDCCH reference signal a new cell specific and relay station common reference signal.

The new cell specific and relay station common reference signal may be mapped in the S OFDM symbol area and then transmitted in FIG. 18. As described above, the new cell specific and relay station common reference signal will be described below (refer to FIGS. 24 to 26). Transmit diversity schemes applicable to the base station may include CDD, PVS, STBC, SFBC, SFBC+FSTD, SFBC+CDD, STBC+FSTD, STBC+CDD, and STBC+PVS, and may use other methods depending on M.

The number of the R-PDCCH reference signal patterns may be defined to be equal to the number of the transmission antennas in the base station. Or in consideration of the fact that the reference signal overhead of the backhaul downlink transmission and the number of applicable reference signal patterns may be set depending on the form of the backhaul downlink subframe, a less number of R-PDCCH reference signal patterns than the number of transmission antennas in the base station may be defined.

When a smaller number of R-PDCCH reference signal patterns than the number of the transmission antennas in the base station is defined, the base station may use antenna virtualization. At this time, the antenna virtualization may apply to both the R-PDCCH and R-PDSCH. Or the base station may transmit the R-PDCCH with the number of virtual antennas or physical antennas used for transmission set to be equal to the number (M) of the R-PDCCH reference signal patterns. M may be set by the cell specific and relay station common RRC signaling or by the system information, or may be set by L1/L2 control information signaling. M may be set differently for each relay station or each group of relay stations. At this time, M may be set by the relay station specific RRC signaling or L1/L2 control information signaling.

3. Case-2

In Case-2, the base station uses precoded transmit diversity adopting in the R-PDCCH transmission mode R (R=1, 2, or 4) virtual antenna ports and uses as the R-PDCCH reference signal the precoded (or virtualized) relay station specific DM-RS.

The base station performs antenna virtualization by applying relay station specific precoding to the transmission antennas. Through the antenna virtualization, the base station sets R virtual antennas and transmits the R-PDCCH in the transmit diversity scheme. At this time, transmit diversity schemes applicable to the base station include, in the case that R=2, CDD, PVS, STBC, and SFBC, and in the case that R=4, SFBC+FSTD, SFBC+CDD, STBC+FSTD, STBC+CDD, STBC+PVS, SFBC, STBC, PVS, and CDD. At this time, the number of DM-RS patterns applying for demodulation/decoding of the R-PDCCH may be R. The R DM-RS patterns may include patterns that have been applied with a precoder for antenna virtualization, and frequency-specifically apply over the R-PDCCH transmission resources. R may be defined depending on the reference signal overhead over the backhaul downlink subframe or the form of the backhaul downlink subframe. The base station may set R in the upper level and inform it to the relay station through relay station specific or cell specific RRC signaling or signaling using relay station specific or cell specific L1/L2 control information.

In the case that the R-PDCCH and R-PDSCH for the same relay station are transmitted in a FDM scheme, that is, when the R-PDCCH and R-PDSCH are transmitted in different PRBs, as many precoded DM-RSs as the number of R virtual antennas may apply to the PRB in which the R-PDCCH is transmitted, and then transmitted.

Or in the case that the R-PDCCH and R-PDSCH are multiplexed in the FDM/TDM scheme (refer to Alt 3 of FIG. 11), the R-PDCCH and R-PDSCH may be multiplexed over any PRB. In this case, if the R-PDSCH is transmitted in the transmit diversity scheme, the R-PDSCH may be also transmitted like the R-PDCCH in the same transmit diversity scheme using the precoded DM-RS defined based on R virtual antennas. To transmit the R-PDSCH in the transmit diversity scheme, precoding vector information for designating and/or applying the transmission mode may be determined by the base station. For this purpose, the base station may perform RRC signaling or L1/L2 PDCCH control information signaling to a specific relay station.

Or in the case that the R-PDCCH and R-PDSCH may be multiplexed in the TDM scheme over the backhaul downlink transmission frequency resource (refer to Alt 1 of FIG. 11), if the R-PDSCH is transmitted in the precoding based spatial multiplexing transmission mode, one of the following two embodiments may apply.

First embodiment: when the first embodiment applies, the rank value of the R-PDSCH for the precoding based spatial multiplexing transmission is equal to or more than R. Such a situation may selectively occur in the backhaul downlink subframe through setting of the R-PDCCH and R-PDSCH or may also occur when the base station intentionally makes the R-PDSCH transmission rank value equal to or greater than R. Under such circumstances, the base station may transmit the R-PDCCH by one of the following two methods:

Method 1: Any R DM-RS's used for demodulation and decoding of the R-PDCCH may be selected from precoded DM-RS's whose number is set as the number of rank values defined in the R-PDSCH transmission. At this time, various methods may apply to select the R precoded DM-RS's. For example, the R precoded DM-RS's may be selected in ascending order from the minimum RS index of the precoded DM-RS's. At this time, precoding applied to the R-PDCCH for antenna virtualization may be defined by the precoding vectors applied to the selected R DM-RS's and applied.

Method 2: Any R DM-RS's used for demodulation and decoding of the R-PDCCH may be selected from precoded DM-RS's whose number is set as the number of rank values defined in the R-PDSCH transmission (At this time, like in Method 1, various methods may apply to select the R precoded DM-RS's. For example, the R precoded DM-RS's may be selected in ascending order from the minimum RS index of the precoded DM-RS's). In the reference signal patterns for the selected R DM-RS's, reference signal resource elements (RS RE's) applicable to demodulation/decoding of the R-PDCCH are grouped. Such grouping may be conducted over the OFDM transmission symbols. The reference signal resource elements (RS RE's) over the reference signal resource element groups may be subjected to precoding for other antennal virtualization and other DM-RS's.

Second embodiment: the second embodiment applies when a rank value of the R-PDSCH for precoding based spatial multiplexing transmission is less than R. In this case, the base station may transmit the R-PDCCH by one of the following two methods:

Method 1: R DM-RS's used for demodulation and decoding of the R-PDCCH include all of the precoded DM-RS's whose number is set as the number (referred to as "P") of rank values defined in the R-PDSCH transmission, and (R-P) necessary DM-RS's may be further defined and transmitted. Based on the precoding applied for the DM-RS's, precoding for antenna virtualization over the R-PDCCH may apply.

Method 2: R DM-RS's used for demodulation and decoding of the R-PDCCH includes all of the precoded DM-RS's whose number is set as the number (referred to as "P") of rank values defined in the R-PDSCH transmission, and (R-P) necessary DM-RS's may be further defined and transmitted. In the reference signal patterns for the R DM-RS's selected through the above procedure, reference signal resource elements (RS SE's) applicable to demodulation/decoding of the R-PDCCH are grouped. Such grouping may be conducted over the OFDM transmission symbols. The reference signal resource elements (RS RE's) over the reference signal resource element groups may be subjected to precoding for antenna virtualization of other DM-RS's and other antennal virtualization and transmitted.

Third embodiment: in the case that the R-PDCCH is transmitted in the transmit diversity scheme based on R virtual antennas, a transmission rank and transmission method of the R-PDSCH may be defined. The base station may designate the transmission rank value through UL grant or semi-static signaling and notify the designated rank value to the relay station. When the R-PDSCH transmission rank value is designated to be more than R (for example, when P is designated as the rank value), the base station conducts precoding based spatial multiplexing transmission based on the corresponding rank value (e.g., P) upon R-PDSCH transmission. At this time, a receiving entity, for example, the relay station receives the signal according to precoding based spatial multiplexing based on the rank value (P).

In the case that in Third embodiment, the transmission rank value of the R-PDSCH is designated (through downlink channel allocation control information signaling such as RRC signaling or L1/L2 PDCCH control information signaling) to have a value (e.g., Q) less than R, the same transmit diversity scheme as that applied for the R-PDCCH may apply to the R-PDSCH transmission based on the R virtual antennas. This case may be referred to as a "fall-back mode". The fall-back mode may be dynamically or semi-statically designated upon application of the transmission method and may be then applied. The base station may notify the relay station through signaling that such transmission is carried out. Or when the R-PDSCH transmission mode is designated as the precoding based spatial multiplexing transmission mode, the R-PDCCH transmission mode is designated as the transmit diversity based on the R virtual antennas, and the transmission rank value of the R-PDSCH is less than R, explicit signaling may be performed in order for the R-PDSCH transmission mode to be designated as the same transmission mode as that applied for the R-PDCCH. That is, to operate in the fall-back mode may be explicitly signaled. The signaling method may include RRC signaling, L1/L2 downlink channel allocation PDCCH signaling or explicitly notifying the fall-back mode through an MAC message, or implicitly notifying the fall-back mode through construction of other control information.

4. Case-3.1

Case-3.1 happens when the base station uses rank-1 closed loop precoding based transmission with M (M=2, 4, or 8) transmission antenna ports as the R-PDCCH transmission mode and uses a new cell specific and relay station common reference signal as the R-PDCCH reference signal.

Unlike the above-mentioned cases, the rank-1 precoding transmission mode in Case 3-1 may apply to R-PDCCH transmission. At this time, the applying precoder (that is, precoding matrix/vector) may be based on the feedback information measured by the relay station or may be applied with wideband PMI or subband PMI according to indication or overriding of the base station independently from or together with the feedback information. At this time, the cycle (or frequency) of the base station's signaling and the feedback of the relay station may be set to be long (that is, to have a lower frequency) or to be short (that is, to have a higher frequency) compared to the feedback of the terminal and signaling cycle of the base station, and especially, the base station's signaling may be conducted through RRC signaling or system information in a cell specific and relay station common manner and may be conducted through RRC signaling in a relay station specific manner. Alternatively, L1/L2 signaling may be conducted, that is, the signaling may be performed through PDCCH or MAC messaging. The new cell specific and relay station common reference signal may apply to demodulation/decoding of the R-PDCCH. The reference signal may not be applied with precoding, but under a certain circumstance, the reference signal may be precoded by a precoding vector designated over the reference signal physical resource.

The number of reference signal patterns for antenna ports used for the R-PDDCH may be M. M may be equal to the number of transmission antennas in the base station, but considering the form of the backhaul downlink subframe or reference signal overhead, may be set to be less than the number of the transmission antennas in the base station.

In the case that a less number of reference signal patterns than the number of the transmission antennas of the base station are defined, the base station may use antenna virtualization for both data and reference signals. Or the base station may set the number of physical antennas or virtual antennas used for transmission equal to the number (M) of the reference signal patterns to transmit the R-PDCCH. M may be set through the cell specific and relay station common RRC signaling, system information, or L1/L2 control information signaling. M may be different for each relay station or each group of relay stations. At this time, M may be set through the relay station specific RRC signaling or L1/L2 control information signaling.

5. Case-3.2

Case-3.2 occurs when the base station uses as the R-PDCCH transmission mode the rank-1 closed loop precoding based transmission with M (M=2, 4, or 8) transmission antenna ports and uses the conventional cell specific reference signal as the R-PDCCH reference signal.

The rank-1 precoding transmission mode may apply to R-PDCCH transmission. At this time, the applying precoder (that is, precoding matrix/vector) may be based on the feedback information measured by the relay station or may be applied with wideband PMI or subband PMI according to indication or overriding of the base station independently from or together with the feedback information. At this time, the cycle (or frequency) of the base station's signaling and the feedback of the relay station may be set to be long or short compared to the feedback of the terminal and signaling cycle of the base station, and especially, the base station's signaling may be conducted through RRC signaling or system information in a cell specific and relay station common manner and may be conducted through RRC signaling in a relay station specific manner. Alternatively, L1/L2 signaling may be conducted, that is, the signaling may be performed through PDCCH or MAC messaging. The conventional cell specific reference signal may be used for demodulation/decoding of the R-PDCCH, and the embodiment in Case-0 may likewise apply. No precoding may apply to the cell specific reference signal for demodulation/decoding of the R-PDCCH, but under a certain circumstance, the cell specific reference signal may be precoded by a precoding vector designated over the reference signal physical resource.

The number of reference signal patterns for antenna ports used for the R-PDDCH may be M. The number of the reference signal patterns may be equal to the number of transmission antennas in the base station, but considering the form of the backhaul downlink subframe or reference signal overhead, may be set to be less than the number of the transmission antennas in the base station.

In the case that a less number of reference signal patterns than the number of the transmission antennas of the base station are defined, the base station may use antenna virtualization for both data and reference signals. Or the base station may set the number of physical antennas or virtual antennas used for transmission equal to the number (M) of the reference signal patterns to transmit the R-PDCCH. M may be set through the cell specific and relay station common RRC signaling, system information, or L1/L2 control information signaling. M may be different for each relay station or each group of relay stations. At this time, M may be set through the relay station specific RRC signaling or L1/L2 control information signaling.

6. Case-4

Case-4 occurs when the base station uses as the R-PDCCH transmission mode the rank-1 closed loop precoding based transmission with M (M=2, 4, or 8) transmission antenna ports and uses as the R-PDCCH reference signal the precoded DM-RS #P (P=an integer between 0 and 8, for example, P=0 or 1) level patterns for demodulation of the R-PDSCH.

The rank-1 precoding transmission mode may apply to R-PDCCH transmission. At this time, the applying precoder (that is, precoding matrix/vector) may be based on the feedback information measured by the relay station or may be applied with wideband PMI or subband PMI according to indication or overriding of the base station independently from or together with the feedback information. At this time, the cycle (or frequency) of the base station's signaling and the feedback of the relay station may be set to be long or short compared to the feedback of the terminal and signaling cycle of the base station, and especially, the base station's signaling may be conducted through RRC signaling or system information in a cell specific and relay station common manner and may be conducted through RRC signaling in a relay station specific manner. Alternatively, L1/L2 signaling may be conducted, that is, the signaling may be performed through PDCCH or MAC messaging.

At this time, the reference signal for demodulation/decoding of the R-PDCCH may be applied with the pattern for a single layer (or a single transmission stream) of the precoded DM-RS for the R-PDSCH. The DM-RS pattern for the single layer may be determined based on the number of transmission antennas included in the base station. Assuming that the DM-RS pattern for the single layer is a DM-RS pattern for the level #P, P may be an integer between 0 and 8—for example, P=0 or 1.

What layer the DM-RS pattern is used for may be designated in a cell specific and relay station common manner or in a relay station specific manner. In the cell specific and relay station common manner, such designation may be conducted through the cell specific and relay station common RRC signaling or system information or L1/L2 control information signaling. If the designation is performed in the relay station specific manner, relay station specific RRC signaling or relay station specific L1/L2 control information signaling may apply. The precoding vector for the single layer DM-RS pattern for R-PDCCH demodulation/decoding may be equal to the rank-1 wideband precoding vector or subband precoding vector applied for R-PDSCH transmission.

In the case that the R-PDCCH transmission mode is the rank-1 closed loop precoding based transmission, the following embodiments may apply depending on the R-PDSCH transmission mode.

First embodiment: in the case that the R-PDSCH transmission applying specifically for the relay station or commonly for the relay stations in the cell is transmit diversity or other non-precoding based transmission, the single layer DM-RS pattern applying to rank-1 precoding transmission of the R-PDCCH may be applied with DM-RS patterns (P=0 or 1 or 2 or 3 or 4 or 5 or 6 or 7 or 8; for example, P=0 or 1) of one layer #P applicable based the number of the transmission antennas in the base station. This may be designated through separate signaling in a cell specific and relay station common or relay station specific manner. For example, such designation may be conducted through RRC signaling, L1/L2 PDCCH control information signaling, or signaling through an MAC message. At this time, the precoder (that is, precoding vector) applied to the DM-RS used for R-PDCCH transmission may be designated in a cell specific and relay station common or relay station specific manner through separate signaling (for example, RRC signaling, L1/L2 PDCCH control information signaling, or MAC message signaling) or may be applied by a predetermined method as well.

Second embodiment: in the case that the R-PDSCH transmission applying specifically for the relay station or commonly for the relay stations in the cell is precoding based spatial multiplexing (where, the spatial multiplexing includes single user MIMO and multiuser MIMO), the single layer DM-RS pattern applying for the rank-1 precoding transmission of the R-PDCCH may be the DM-RS pattern of the single layer #P applicable based on the number of the transmission antennas in the base station. Here, P may be an integer between 0 and 8—for example, P may be 0 or 1. The precoding for the R-PDCCH and the DM-RS pattern of the layer #P may be constituted of the entire or specific one or more column vectors of the precoder (that is, precoding matrix) applying for R-PDSCH transmission. At this time, the column vectors may be selected using layer index values of the layer DM-RS patterns of the DM-RS used for R-PDCCH transmission, or may be explicitly signaled or implicitly set as any value. In the case of explicit signaling, the designation may be performed through separate signaling in a cell specific and relay station common manner or relay station specific manner. For example, such designation may be performed through RRC signaling, L1/L2 PDCCH control information signaling, or signaling with an MAC message.

7. Case-5.1

Case-5.1 happens when the base station uses rank-1 open loop precoding based transmission with M (M=2, 4, or 8) transmission antenna ports as the R-PDCCH transmission mode and uses a new cell specific and relay station common reference signal as the R-PDCCH reference signal. At this time, the applying precoding vector may be based on the long-term of the relay station and/or long-term indication or overriding of the base station. At this time, such designation may be performed through separate signaling, such as RRC signaling, L1/L2 PDCCH control information signaling, or signaling with an MAC message, in a cell specific and relay station common or relay station specific manner.

The rank-1 precoding transmission mode may apply to the R-PDCCH transmission. At this time, the applying precoder (that is, precoding matrix/vector) may be determined based on the feedback information of the relay station or indication of the base station. Or the precoder may be applied with precoding (vector) cycling. The precoding vector cycling means that the whole or some of the rank-1 precoding vectors may be sequentially applied with one or more subcarriers, groups of subcarriers (which may be represented in plural PRB units) or the minimum unit of physical resources designated consecutively for R-PDCCH transmission. For M transmission antenna ports, the reference patterns of the new cell specific and relay station common reference signal defined in the S OFDM symbols are used for demodulation/decoding of the R-PDCCH. The reference signal may not be subjected to precoding or under a certain situation, may be precoded by the precoding vector designated over the reference signal physical resource. At this time, the designated precoding vector or a precoding vector set used upon application of the precoding vector cycling may be predefined and then designated, but may be alternatively designated through separate signaling in a cell specific and relay station common or relay station specific manner. For example, such designation may be conducted through RRC signaling, L1/L2 PDCCH control information signaling, or signaling with an MAC message.

The number of reference signal patterns for antenna ports used for the R-PDDCH may be M. The number of the reference signal patterns may be equal to the number of transmission antennas in the base station, but considering the form of the backhaul downlink subframe or reference signal overhead, may be set to be less than the number of the transmission antennas in the base station.

In the case that a less number of reference signal patterns than the number of the transmission antennas of the base station are defined, the base station may use antenna virtualization for both data and reference signals. Or the base station may set the number of physical antennas or virtual antennas used for transmission equal to the number (M) of the reference signal patterns to transmit the R-PDCCH. M may be set through the cell specific and relay station common RRC signaling, system information, or L1/L2 control information signaling. M may be different for each relay station or each group of relay stations. At this time, M may be set through the relay station specific RRC signaling or L1/L2 control information signaling.

8. Case-5.2

Case-5.2 happens when the base station uses rank-1 open loop precoding based transmission with M (M=2, 4, or 8) transmission antenna ports as the R-PDCCH transmission mode and uses the conventional cell specific reference signal as the R-PDCCH reference signal. At this time, the applying precoding vector may be based on the long-term of the relay station and/or long-term indication or overriding of the base station. At this time, such designation may be performed through separate signaling, such as RRC signaling, L1/L2 PDCCH control information signaling, or signaling with an MAC message, in a cell specific and relay station common or relay station specific manner.

The rank-1 precoding transmission mode may apply to the R-PDCCH transmission. At this time, the applying precoder (that is, precoding matrix/vector) may be determined based on the feedback information of the relay station or indication of the base station. Or the precoder may be applied with precoding (vector) cycling. At this time, the designated precoding vector or a precoding vector set used upon application of the precoding vector cycling may be predefined and then designated, but may be alternatively designated through separate signaling in a cell specific and relay station common or relay station specific manner. For example, such designation may be conducted through RRC signaling, L1/L2 PDCCH control information signaling, or signaling with an MAC message.

In such circumstances, M conventional cell specific reference signal patterns may be used for demodulation/decoding of the R-PDCCH with respect to M transmission antenna ports (similar to the above-described Case-0). The reference signal may not be subjected to precoding, but under a certain circumstance, may be precoded by the precoding vector designated over the reference signal physical resource.

The number of reference signal patterns for antenna ports used for the R-PDDCH may be M. The number of the reference signal patterns may be equal to the number of transmission antennas in the base station, but considering the form of the backhaul downlink subframe or reference signal overhead, may be set to be less than the number of the transmission antennas in the base station.

In the case that a less number of reference signal patterns than the number of the transmission antennas of the base station are defined, the base station may use antenna virtualization for both data and reference signals. Or the base station may set the number of physical antennas or virtual antennas used for transmission equal to the number (M) of the reference signal patterns to transmit the R-PDCCH. M may be set through the cell specific and relay station common RRC signaling, system information, or L1/L2 control information signaling. M may be different for each relay station or each group of relay stations. At this time, M may be set through the relay station specific RRC signaling or L1/L2 control information signaling.

9. Case-6

Case-6 happens when the base station uses rank-1 open loop precoding based transmission with M (M=2, 4, or 8) transmission antenna ports as the R-PDCCH transmission mode and uses as the R-PDCCH reference signal the layer pattern of precoded DM-RS #P (P is an integer between 0 and 8, e.g., P=0 or 1) for R-PDSCH demodulation. At this time, the applying precoding vector may be based on the long-term of the relay station and/or long-term indication or overriding of the base station. At this time, such designation may be performed through separate signaling, such as RRC signaling, L1/L2 PDCCH control information signaling, or signaling with an MAC message, in a cell specific and relay station common or relay station specific manner.

The rank-1 precoding transmission mode may apply to the R-PDCCH transmission. At this time, the applying precoder (that is, precoding matrix/vector) may be determined based on the feedback information of the relay station or indication of the base station. Or the precoder may be applied with precoding (vector) cycling. At this time, the designated precoding vector or a precoding vector set used upon application of the precoding vector cycling may be predefined and then designated, but may be alternatively designated through separate signaling in a cell specific and relay station common or relay station specific manner. For example, such designation may be conducted through RRC signaling, L1/L2 PDCCH control information signaling, or signaling with an MAC message.

At this time, the reference signal for demodulation/decoding of the R-PDCCH may be applied with the pattern for a single layer of the precoded DM-RS for the R-PDSCH. The DM-RS pattern for the single layer may be determined based on the number of transmission antennas included in the base station. Assuming that the DM-RS pattern for the single layer is a DM-RS pattern for the level #P, P may be an integer between 0 and 8—for example, P=0 or 1.

What layer the DM-RS pattern is used for may be designated in a cell specific and relay station common manner or in a relay station specific manner. In the cell specific and relay station common manner, such designation may be conducted through the cell specific and relay station common RRC signaling or system information or L1/L2 control information signaling. If the designation is performed in the relay station specific manner, relay station specific RRC signaling or relay station specific L1/L2 control information signaling may apply. The precoding for the single layer DM-RS pattern for R-PDCCH demodulation/decoding may be applied with the same precoder as the rank-1 wideband precoder or subband precoder applying for R-PDSCH transmission with respect to the corresponding physical resource RE. Or the precoding may be conducted by the rank-1 wideband precoder or subband precoder separately signaled from the base station in such a manner as being not applied with the precoding vector cycling. The rank-1 wideband precoder or subband precoder may be defined as any column vector in a precoding matrix given in the rank more than 1. At this time, the precoding vector may be designated, as described above, by the base station in a cell specific and relay station common manner or relay station specific manner. In a cell specific and relay station common manner, such designation may be performed through cell specific and relay station common RRC signaling or system information, or through L1/L2 control information signaling.

Under the situations applied with the R-PDCCH transmission mode as described above, detailed transmission methods of the R-PDCCH and R-PDSCH may change depending on the transmission mode applied to the R-PDSCH.

First embodiment: in the case that the R-PDSCH transmission mode is a transmit diversity or other non-precoding based transmission mode with respect to a specific relay station or the whole relay stations, the rank-1 precoding transmission mode may apply to the R-PDCCH transmission. The precoder applying for the rank-1 precoding transmission mode may be determined depending on the feedback information of the relay station or indication or overriding of the base station. Or the precoder may be determined by applying the precoding vector cycling in which the whole or some of the applicable rank-1 precoding vectors may be sequentially applied with one or more subcarriers, groups of subcarriers (which may be represented in plural PRB units) or the minimum unit of physical resources designated consecutively for R-PDCCH. The precoding vector set applied for the precoding vector cycling may be designated in a cell specific and relay station common manner or relay station specific manner. In the cell specific and relay station common manner, such designation may be performed through cell specific and relay station common RRC signaling or system information or L1/L2 control information signaling. At this time, the single precoded layer DM-RS pattern may apply. The single layer DM-RS pattern may be a DM-RS pattern of the single layer #P applicable based on the number of transmission antennas included in the base station. Here, P may be an integer between 0 and 8—for example, P may be 0 or 1.

What layer the DM-RS pattern is used for may be designated in a cell specific and relay station common manner or in a relay station specific manner. In the cell specific and relay station common manner, such designation may be conducted through the cell specific and relay station common RRC signaling or system information or L1/L2 control information signaling. If the designation is performed in the relay station specific manner, relay station specific RRC signaling or relay station specific L1/L2 control information signaling may apply. The precoding vector for the single layer DM-RS pattern for R-PDCCH demodulation/decoding may be equal to the rank-1 wideband precoding vector or subband precoding vector applied for R-PDSCH transmission. Or the precoding may be conducted by the rank-1 wideband precoder or subband precoder separately signaled from the base station in such a manner as being not applied with the precoding vector cycling. The rank-1 wideband precoder or subband precoder may be defined as any column vector in a precoding matrix given in the rank more than 1.

The selection of the column vector may be set depending on the layer index value of the layer DM-RS pattern of the DM-RS used for R-PDCCH transmission, but any value may be explicitly signaled or implied set.

Second embodiment: in the case that the R-PDSCH transmission mode is precoding based spatial multiplexing (including SU-MIMO and MU-MIMO both), the rank-1 precoding transmission mode may apply to the R-PDCCH transmission. At this time, the applying precoder (that is, precoding matrix/vector) may be determined based on the feedback information of the relay station or indication of the base station. Or the precoder may be applied with precoding (vector) cycling. At this time, a precoding vector set used for the precoding vector cycling may be designated by the base station in a cell specific and relay station common manner or relay station specific manner. In the relay station common manner, such designation may be performed through cell specific and relay station common RRC signaling or system information or L1/L2 control information signaling.

At this time, the reference signal for demodulation/decoding of the R-PDCCH may be applied with the pattern for the single layer of the precoded DM-RS. The DM-RS pattern for the single layer may be determined based on the number of the transmission antennas included in the base station. Assuming that the DM-RS pattern for the single layer is a DM-RS pattern for the level #P, P may be an integer between 0 and 8—for example, P=0 or 1.

What layer the DM-RS pattern is used for may be designated in a cell specific and relay station common manner or in a relay station specific manner. In the cell specific and relay station common manner, such designation may be conducted through the cell specific and relay station common RRC signaling or system information or L1/L2 control information signaling. If the designation is performed in the relay station specific manner, relay station specific RRC signaling or relay station specific L1/L2 control information signaling may apply. The precoding for the single layer DM-RS pattern for R-PDCCH demodulation/decoding may be applied with the same precoder as the rank-1 wideband precoder or subband precoder applying for R-PDSCH transmission with respect to the corresponding physical resource RE. Or the precoding may be conducted by the rank-1 wideband precoder or subband precoder separately signaled from the base station in such a manner as being not applied with the precoding vector cycling. The rank-1 wideband precoder or subband precoder may be defined as any column vector in a precoding matrix given in the rank more than 1.

At this time, the R-PDSCH transmission may be applied with the rank-1 open loop or more-than-rank 1 precoding transmission. Then, the precoder used for R-PDCCH transmission may be the same as the precoder used for R-PDSCH transmission, and depending on the rank value for R-PDSCH transmission, may become the column vector in the precoding matrix used for R-PDSCH transmission. The selection of the column vector may be set depending on the index value of the layer DM-RS pattern of the DM-RS used for R-PDCCH transmission or any value may be explicitly signaled or implicitly set.

10. Case-7

Case-7 happens when the base station uses as the R-PDCCH transmission mode the same transmission mode (for example, closed loop spatial multiplexing) as the R-PDSCH transmission mode and uses as the R-PDCCH reference signal the precoded DM-RS pattern for the R-PDSCH demodulation.

In the case that the closed loop spatial multiplexing transmission mode applies to the R-PDSCH transmission to the relay station, the same closed loop spatial multiplexing transmission mode may apply as well for the R-PDCCH transmission. At this time, R-PDCCH requires relatively high reliability over R-PDSCH. Accordingly, the R-PDCCH transmission may be performed at a low rank (the number of transmission layers or transmission streams) compared to the R-PDSCH transmission. The rank applying for R-PDCCH may be set at an upper layer by the base station in a cell specific and relay station common or relay station specific manner. In the case that information on the rank setting is set cell specifically or relay station commonly, the information may be transferred to the relay station through cell specific and relay station common RRC signaling or system information or L1/L2 control information signaling. In the case of being designated in a relay station specific manner, the information on the rank setting may be transferred to the relay station through relay station specific RRC signaling or relay station specific L1/L2 control information signaling. Information on designation of the precoder used for the corresponding R-PDCCH transmission may also be set by the base station at an upper layer in a relay station specific manner. In such circumstances, the information on designation of the precoder may be transferred to the corresponding relay station through relay station specific RRC signaling or relay station specific L1/L2 control information signaling.

As many precoded layer DM-RS patterns as the rank value set for R-PDCCH transmission may be used as reference signals for demodulation/decoding of the R-PDCCH. It is assumed that the rank value set for R-PDCCH transmission is R. Then, R precoded layer DM-RS patterns may be selected at the layer DM-RS designated uniquely for each applicable layer based on the number of the transmission antennas in the base station. That is, among the layer #P DM-RS patterns (P=0 or 1 or 2 or 3 or 4 or 5 or 6 or 7 or 8; for example P=0 or 1), as many patterns as R may be designated and used. The selection of the R precoded layer DM-RS patterns may be performed in a cell specific and relay station common or relay station specific manner. That is, when information on the designation is set cell specifically or relay station commonly, the information may be transferred to the relay station through cell specific and relay station common RRC signaling or system information or L1/L2 control information signaling. Or when the information on the designation is designated relay station specifically, the information may be transferred to the relay station through relay station specific RRC signaling or relay station specific L1/L2 control information signaling. At this time, precoding for the corresponding layer DM-RS pattern may be performed equally by the precoder designated together with the rank applying for R-PDCCH transmission. The precoder, as described above, may be explicitly signaled by the base station or then set. However, the precoder may be implied set such as, when R-PDSCH performs precoding based transmission, a precoder used for R-PDSCH transmission or one or more column vectors for the precoder. The selection of the column vector may be determined (for example, equally determined) based on the layer index value for the DM-RS pattern of the DM-RS used for R-PDCCH transmission, or any value may be explicitly signaled or set implicitly.

11. Case-8

Case-8 happens when the base station uses as the R-PDCCH transmission mode the same transmission mode as the R-PDSCH transmission mode (for example, open loop spatial multiplexing) and uses as the R-PDCCH reference signal the precoded DM-RS pattern for R-PDSCH demodulation.

In the case that the open loop spatial multiplexing transmission mode applies to the R-PDSCH transmission to the relay station, the same closed loop spatial multiplexing transmission mode may apply as well for the R-PDCCH transmission. At this time, R-PDCCH requires relatively high reliability over R-PDSCH. Accordingly, the R-PDCCH transmission may be performed at a low rank (the number of transmission layers or transmission streams) compared to the R-PDSCH transmission. The rank applying for R-PDCCH may be set at an upper layer by the base station in a cell specific and relay station common or relay station specific manner. In the case that information on the rank setting is set cell specifically or relay station commonly, the information may be transferred to the relay station through cell specific and relay station common RRC signaling or system information or L1/L2 control information signaling. The precoder used for transmission of the corresponding R-PDCCH may be determined depending on feedback information of the relay station or indication of the base station. Or the precoder may be applied with precoding (vector) cycling. At this time, the information on the precoding vector or information on one or more precoding vector sets applied for the precoding vector cycling may be transmitted to the relay station through cell specific and relay station common RRC signaling or system information or L1/L2 control information signaling. In the case that the corresponding information is designated relay station specifically, the information may be transferred to the relay station through relay station specific RRC signaling or relay station specific L1/L2 control information signaling.

As many precoded layer DM-RS patterns as the rank value set for R-PDCCH transmission may be used as reference signals for demodulation/decoding of the R-PDCCH. It is assumed that the rank value set for R-PDCCH transmission is R. Then, R precoded layer DM-RS patterns may be selected at the layer DM-RS designated uniquely for each applicable layer based on the number of the transmission antennas in the base station. That is, among the layer #P DM-RS patterns (P=0 or 1 or 2 or 3 or 4 or 5 or 6 or 7 or 8; for example P=0 or 1), as many patterns as R may be designated and used. The selection of the R precoded layer DM-RS patterns may be performed in a cell specific and relay station common or relay station specific manner. That is, when information on the designation is set cell specifically or relay station commonly, the information may be transferred to the relay station through cell specific and relay station common RRC signaling or system information or L1/L2 control information signaling. Or when the information on the designation is designated relay station specifically, the information may be transferred to the relay station through relay station specific RRC signaling or relay station specific L1/L2 control information signaling. At this time, precoding for the corresponding layer DM-RS pattern may be performed equally by the precoder designated together with the rank applying for R-PDCCH transmission. Precoding for the corresponding layer DM-RS pattern may be applied with the rank-1 wideband precoder applied for R-PDCCH transmission with respect to individual reference signal resource element over the corresponding DM-RS pattern and a precoder the same as the subband precoder. Unlike this, in such a manner as not being applied with the precoding vector cycling, the precoding may be performed by the rank-1 wideband precoder or subband precoder separately signaled from the base station.

The precoder, as described above, may be explicitly signaled by the base station or then set. However, the precoder may be implied set such as, when R-PDSCH performs precoding based transmission, a precoder used for R-PDSCH transmission or one or more column vectors for the precoder. The selection of the column vector may be determined (for example, equally determined) based on the layer index value for the DM-RS pattern of the DM-RS used for R-PDCCH transmission, or any value may be explicitly signaled or set implicitly.

12. Case-9/10/11/12

Case-9 to 12 are respectively the same as Case-3 to 6 in light of transmission methods of the R-PDCCH and setting methods of DM-RS's used for demodulation/decoding of the R-PDCCH. The only difference is that in Cases 3 to 6, the number of precoders (that is, precoding vectors) set for R-PDCCH, the number of DM-RS layer RS patterns applied for R-PDCCH transmission and the number of precoders applied for each of them are set as "1" whereas in Cases 9 to 12, the numbers are set as "2". At this time, setting methods may be the same as those suggested in Cases 3 to 6 under the assumption that two precoders or DM-RS layer RS patterns do not overlap each other.

Various cases regarding transmission mode designation for R-PDCCH and types and patterns of reference signals applied for the R-PDCCH transmission have been described so far. In such a manner that depending on the number of transmission antennas in the base station (or cell) or transmission mode, any case may be predetermined, the types or patterns of reference signals applied for R-PDCCH transmission and transmission mode of the R-PDCCH may be set. As the case may be, one or more may be selected from the plural possible cases, and information on the selected case may be signaled in the form of upper layer signaling in a cell specific and relay station common or relay station specific manner. In the case that the information on the selected case is cell specific and relay station common, cell specific and relay station common RRC signaling or system information or L1/L2 control information signaling may apply. In the case that the information on the selected case is designated relay station specifically, relay station specific RRC signaling or relay station specific L1/L2 control information signaling may be performed.

Or alternatively, as mentioned in connection with some cases, depending on the transmission mode designation of the R-PDSCH, the R-PDCCH transmission mode case may be designated in a one-to-one mapping manner. If the R-PDSCH has an MU-MIMO transmission mode, allocation of transmission physical resources of the R-PDCCH may be conducted independently from the physical resource allocation of the R-PDSCH and may be set as the transmission mode case of the R-PDCCH that has been set corresponding to the number of streams applied for the corresponding relay station over the MU-MIMO.

The above-described R-PDCCH transmission mode and description on the types and patterns for R-PDCCH demodulation/decoding are based upon the assumption that the structure of the backhaul downlink subframe provides backward comparability for LTE terminals as shown in FIG. 18. That is, the relay station has a structure of allocating the resource to the LTE terminal over a first predetermined number of OFDM symbols in the backhaul downlink subframe and then receiving signals from the base station over the subsequent OFDM symbols with the protection section. However, the present invention is not limited thereto and may also apply to backhaul downlink subframe structures that do not provide backward compatibility to the LTE terminal. For example, a subframe structure may be used in a multicarrier system, wherein for some carriers, a subframe structure considering backward compatibility to the LTE terminal as shown in FIG. 18 is used, and for other carriers, a subframe structure not providing backward compatibility to the LTE terminal may be used. At this time, the above other carriers may also be applied with the R-PDCCH transmission mode and the methods associated with the types and patterns of the reference signals for R-PDCCH demodulation/decoding according to the present invention.

Although the above description suggests, in detail, the transmission method of the R-PDCCH and types and patterns of the DM-RS used, this should not be construed as limited thereto. For instance, according to the present invention, methods of transmitting PDCCH over carriers that are not associated with monitoring or resource allocation to the existing LTE release-8 terminals (such carriers may be referred to as "non-backward compatible carriers) and DM-RS patterns used may apply as well. At this time, downlink subframes used over the non-backward compatible carriers may have a structure as described in connection with FIG. 6. Although in FIG. 6 three PDCCH transmission symbols are set, the present invention is not limited thereto and one or two symbols may be set. Or the present invention may apply to the backhaul downlink subframe over the non-backward compatible carrier in association with the transmission method of the R-PDCCH and DM-RS patterns used for the transmission method. At this time, the target backhaul downlink subframe may have any one of the structures described in connection with FIGS. 11 to 18, and may have other structures as well. These other subframe structures are described below.

Figure 21:
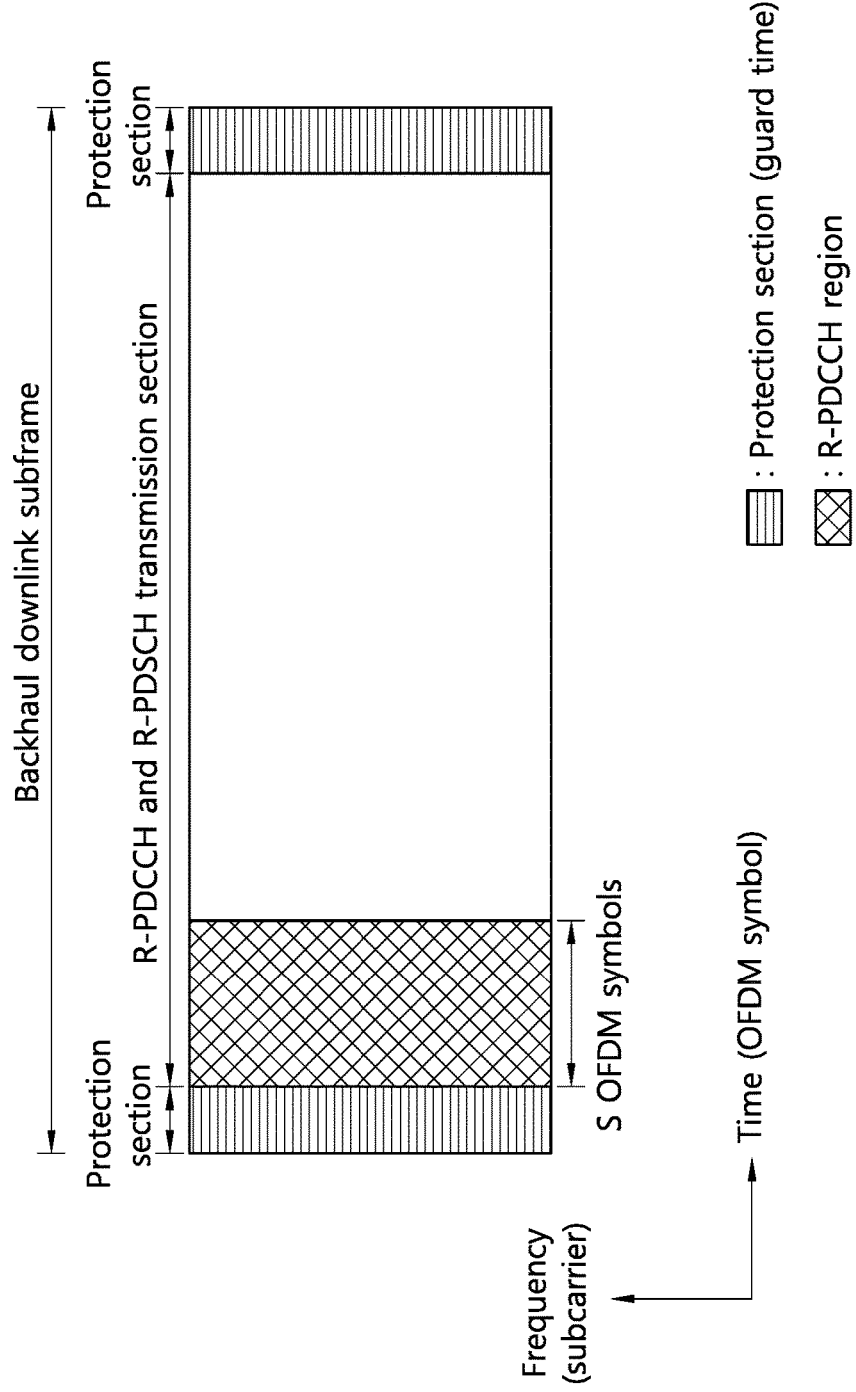
FIGS. 21 to 23 illustrate examples of backhaul downlink subframe structures that do not provide backward compatibility.
Figure 22:
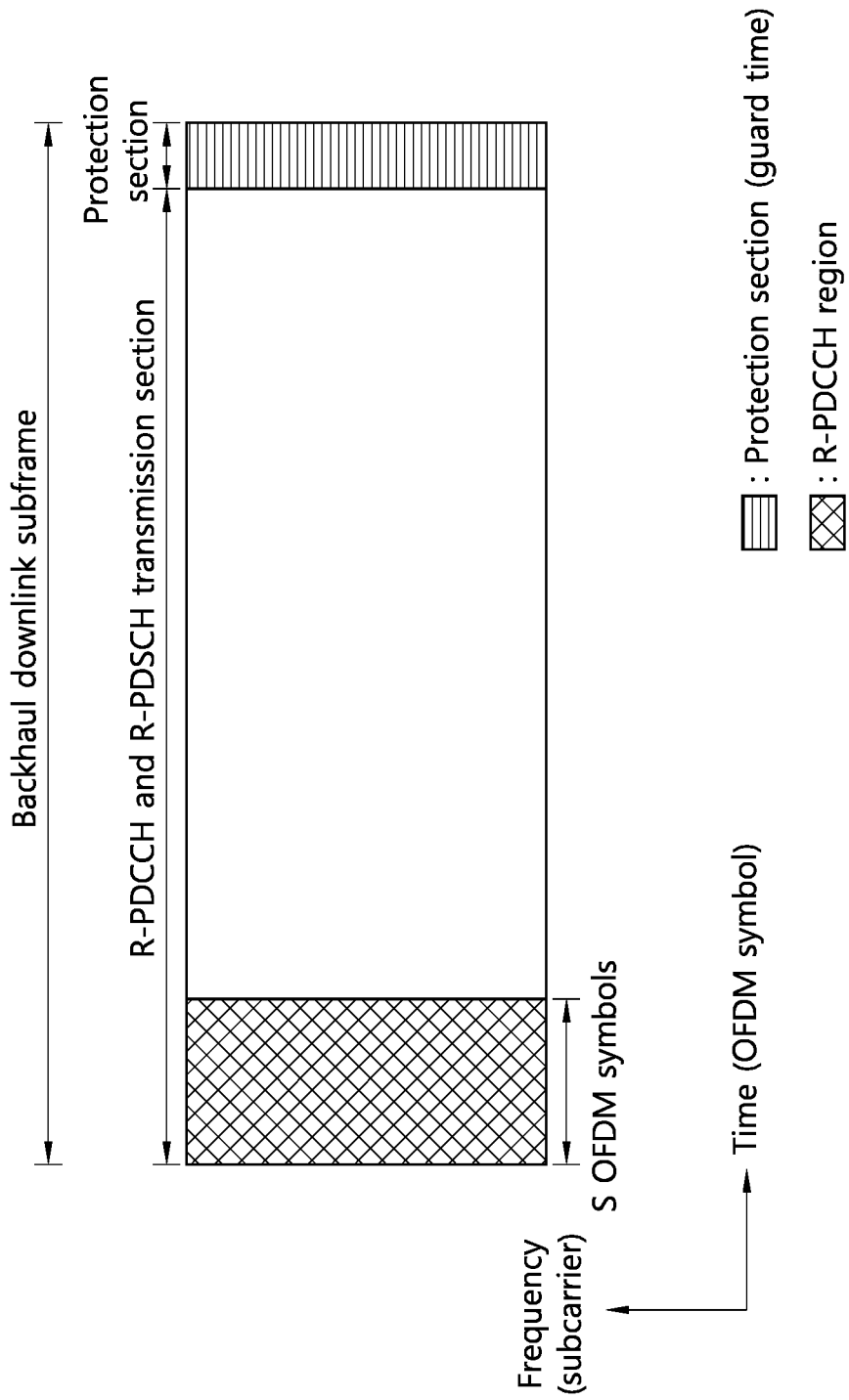
Figure 23:
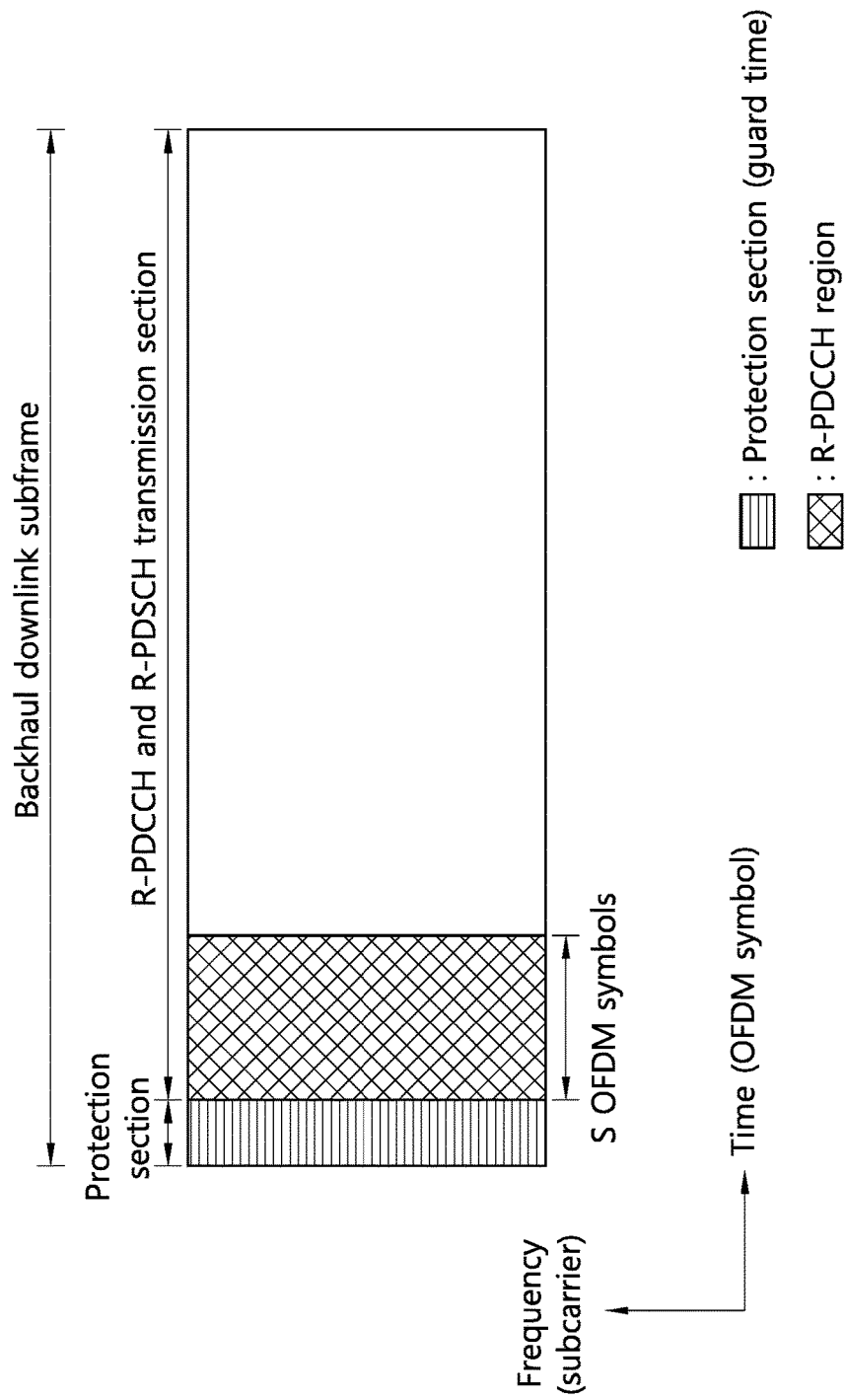

FIGS. 21 to 23 illustrate examples of backhaul downlink subframe structures that do not provide backward compatibility.

Referring to FIG. 21, the backhaul downlink subframe includes protection sections at first and end portions, and receives the R-PDCCH in S OFDM symbols subsequent to the first protection section. Referring to FIG. 22, the R-PDCCH is received in first S OFDM symbols in the backhaul downlink subframe that includes a protection section at the end portion. FIG. 23 is different from FIG. 21 in that in FIG. 23 the backhaul downlink subframe does not include a protection section at the end portion. The subframe structures shown in FIGS. 21 to 23 may apply to non-backward compatible carriers.

New cell specific and relay station common reference signals are described that are used as R-PDCCH reference signals for demodulation/decoding of the R-PDCCH in Cases 1, 3.1, 5.1, 9.1, and 11.

Figure 24:
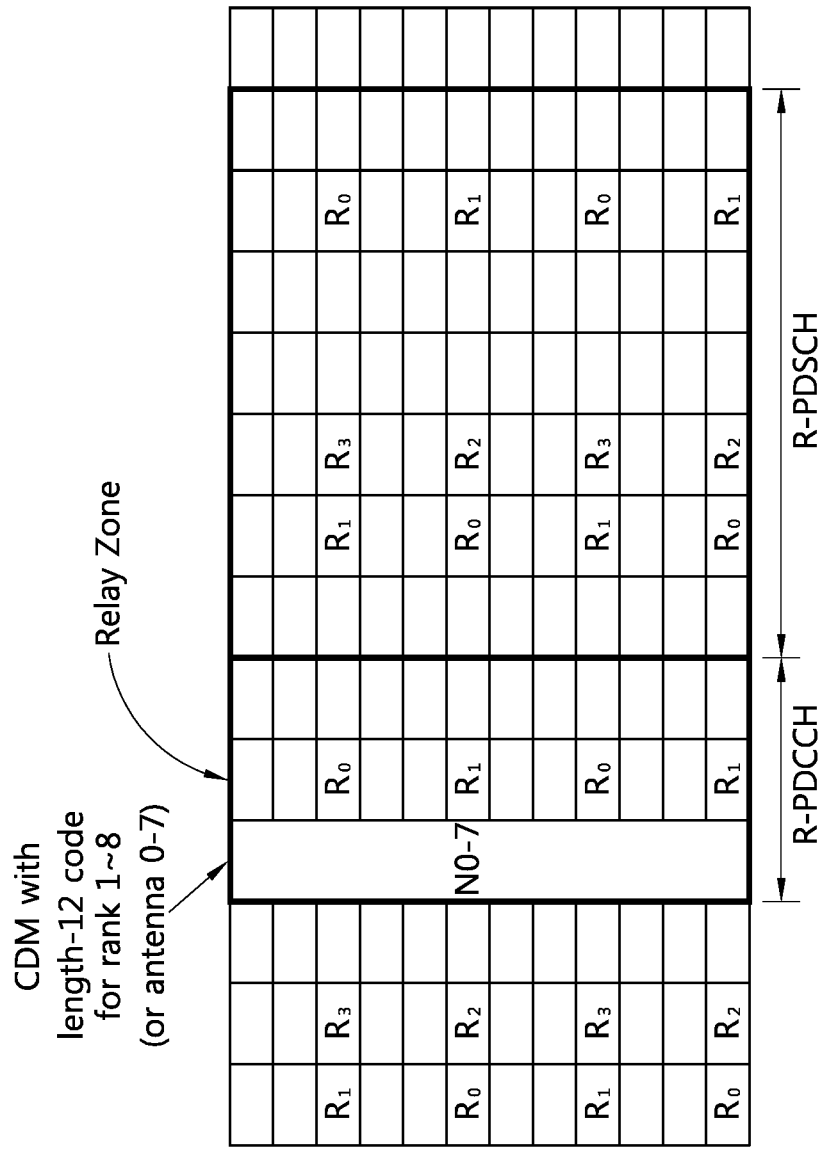
FIGS. 24 to 26 illustrate new cell specific and relay station common reference signals (simply referred to as "new reference signals") that may be used as the R-PDCCH reference signals.
Figure 25:
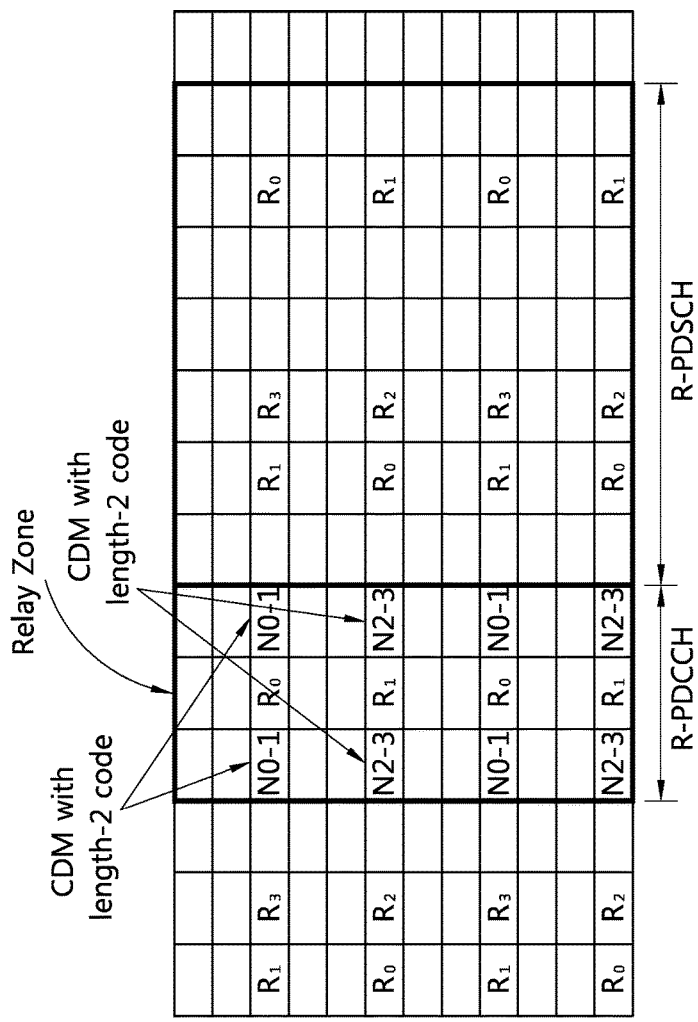
Figure 26:
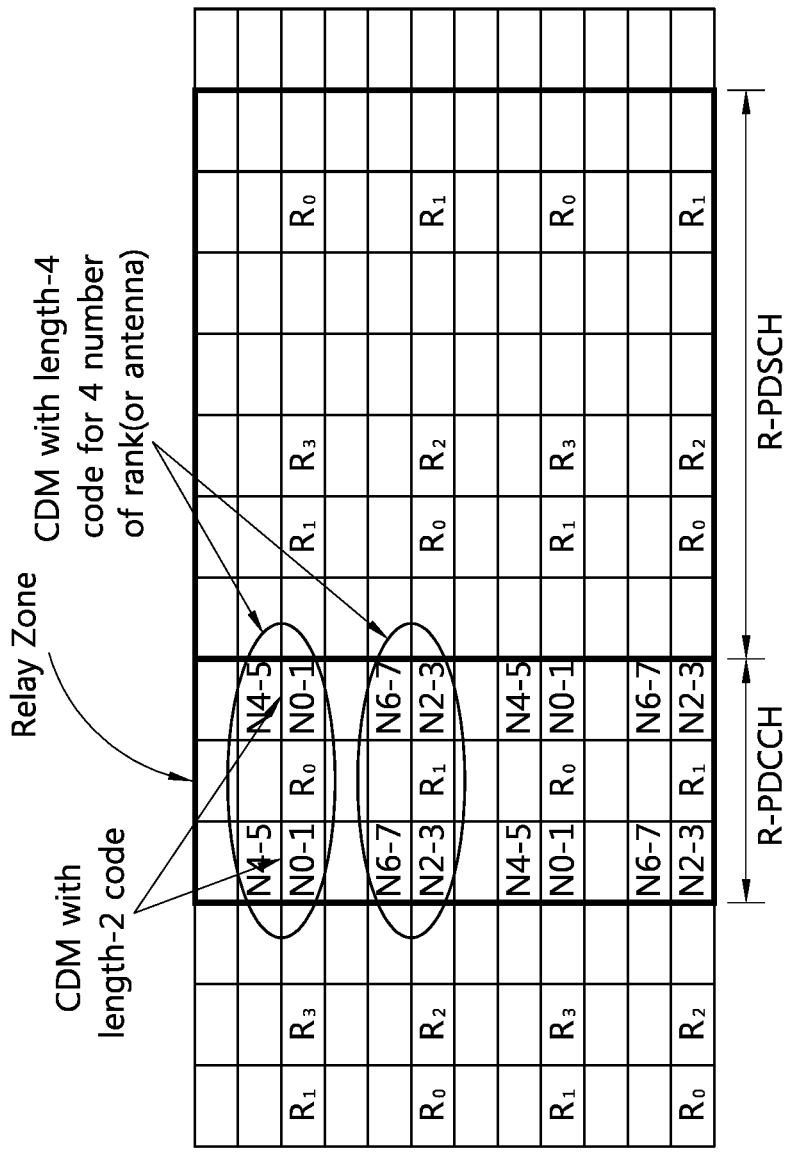

FIGS. 24 to 26 illustrate new cell specific and relay station common reference signals (simply referred to as "new reference signals") that may be used as the R-PDCCH reference signals.

Referring to FIG. 24, the R-PDCCH area may include fourth OFDM symbols to sixth OFDM symbols in the backhaul downlink subframe. In this case, the new reference signal is arranged in one OFDM symbol that does not overlap RE (marked with R0 to R3) to which the conventional cell specific reference signal is allocated. FIG. 24 illustrates an example where a new reference signal is allocated in the fourth OFDM symbol of the backhaul downlink subframe. In this case, a code whose length is 12 may be CDMed to twelve RE's and allocated in the fourth OFDM symbol to support up to eight transmission antenna ports.

FIG. 25 illustrates an example of a new reference signal supporting up to four transmission antenna ports. Four RE's are allocated for each transmission antenna port and the same RE is allocated for a pair of transmission antenna ports (for example, transmission antenna ports #{0, 1}, #{2,3}). However, different codes are CDMed and reference signals for pairs of transmission antenna ports may be distinguished from each other. The new reference signal is arranged in two OFDM symbols that do not overlap the RE (marked with R0 to R3) to which the conventional cell specific reference signal is allocated. For instance, the new reference signal may be allocated in the fourth OFDM symbol and the sixth OFDM symbol of the backhaul downlink subframe.

FIG. 26 illustrates an example of a new reference signal supporting up to eight transmission antenna ports. Four RE's are allocated for each transmission antenna port and the same RE may be allocated for a pair of transmission antenna ports (for example, transmission antenna ports #{0, 1}, #{2,3}, #{4,5}, #{6,7}). However, different codes may be CDMed and reference signals for the pairs of transmission antenna ports may be distinguished from each other. The new reference signal is arranged in two OFDM symbols that do not overlap the RE (marked with R0 to R3) to which the conventional cell specific reference signal is allocated. For instance, the new reference signal may be allocated in the fourth OFDM symbol and the sixth OFDM symbol of the backhaul downlink subframe.

Hereinafter, the downlink DM-RS is described.

The terminal specific DM-RS is a reference signal uniquely defined over the downlink frequency resource that the base station allocates to any terminal in any downlink subframe. The reference signal pattern of the DM-RS is defined on a PRB (Physical Resource Block) basis that is the minimum unit for the downlink frequency resource allocation. The downlink DM-RS defined so far is assumed to be used only in the precoding based transmission mode among downlink MIMO transmission modes and assumed to be applied with the same precoding as precoding applied over the data transmission RE (Resource Elements, that is, subcarriers). However, for any specific purposes, it may also be considered that the DM-RS may be transmitted without intentionally performing precoding.

The overhead of the time-frequency resource (that is, reference signal RE (subcarrier)) of the DM-RS may be set different depending on the rank, that is, the number of transmission layers (or streams).

Two CDM groups (time-frequency resources (RS RE) setting the unique orthogonal resources of the reference signal as CDM) may be used for DM-RS. Any CDM group is constituted in the same pattern as a frequency-shifted version of another CDM group. Accordingly, in the case of rank-1 or rank-2, one CDM group is used and in the case of rank-3 or higher (up to rank-8), two CDM groups apply to any PRB.

For instance, in the case that the CDM group is defined with twelve RS RE's (that is, subcarriers), at rank-2 or lower, the RS RE overhead is 12 and at rank-3 or higher, RS RE overhead is 24. The RS-RE overhead means the number of reference signal RE's included in the PRB. If the RS-RE overhead increases, the number of RE's that may be used for data transmission decreases.

The above description is based on the assumption that the downlink MIMO precoding applies. Under a certain circumstance where the precoding does not apply, RS resources orthogonal while not precoded for each antenna port may apply in association with the number of antenna ports.

In any CDM group, the to-be-supported antenna port or RS resource for each transmission layer may be defined using time domain (that is, over OFDM symbols defined in light RS RE) orthogonal code cover (OCC). At this time, in the case that the number of whole ranks is equal to or less than 4, 2 applies to the code length of the OCC and in the case that the number of the whole ranks is more than 4, the code length of the OCC may apply as 4. In the former situation (when the code length is 2), this may be equivalently defined as the OCC orthogonal sequence having a code length of 4 and may then apply.

Figure 27:
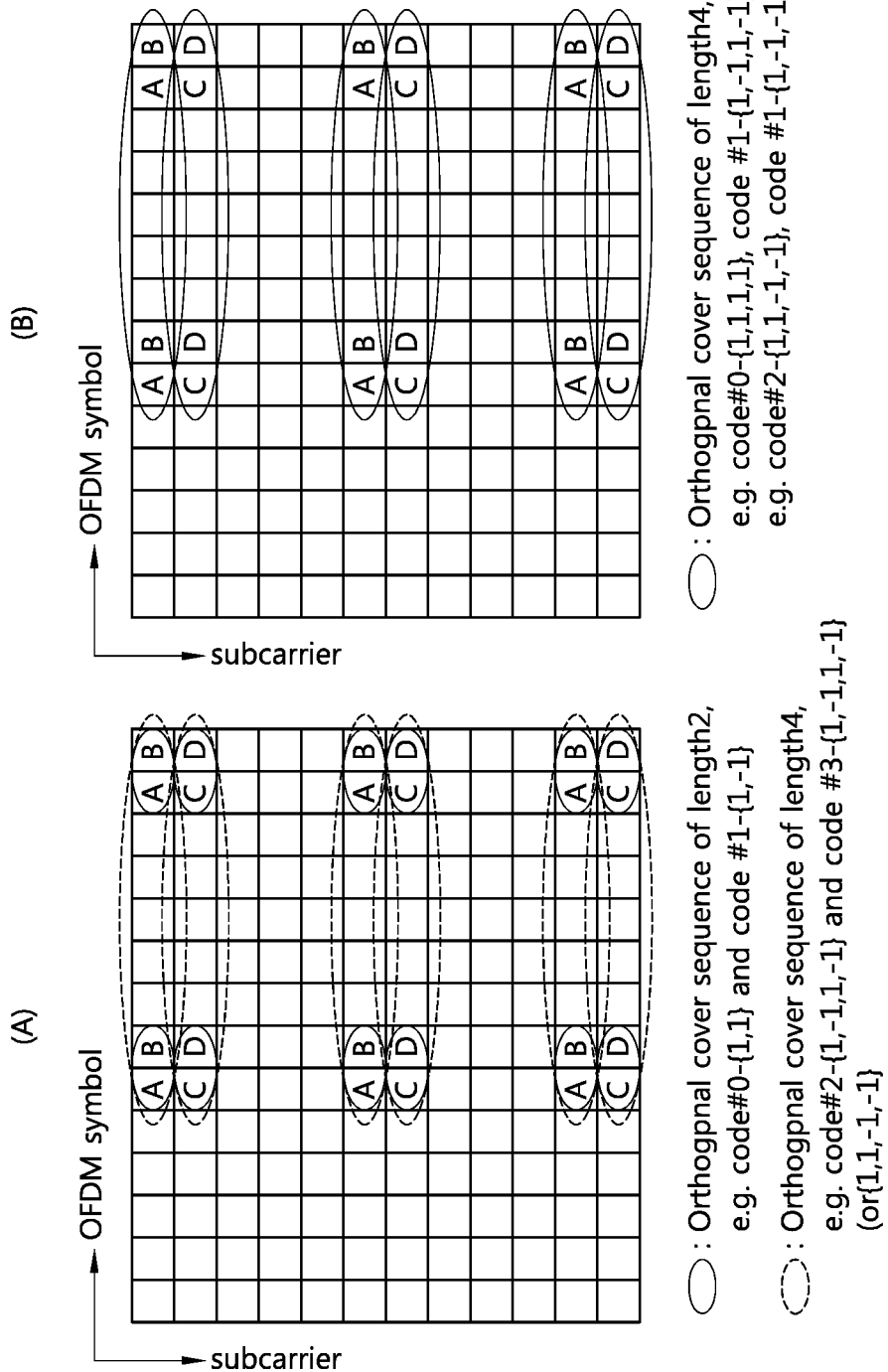
FIG. 27, including view (a) and view (b), illustrates an example of applying two CDM groups and the OCC applied for each CDM group.

FIG. 27 including view (a) and view (b), illustrates an example of applying two CDM groups and the OCC applied for each CDM group.

Referring to FIG. 27, the first CDM group may include RE's marked with A and B, and the second CDM group may include RE's marked with C and D. Each CDM group has a RS RE overhead of 12. And, the second CDM group is a frequency-shifted version of the first CDM group. As shown in FIG. 27(a), two sequences having an OCC code length of 2—for example, {1,1}, {1,-1}—may apply to each CDM group or two sequences having an OCC code length of 4—for example, {1,1,1,1}, {1,-1,1,-1}—may apply to each CDM group. Or as shown in FIG. 27(b), four codes having an OCC code length of 4—for example, {1,1,1,1},{1,-1,1,-1},{1,1,-1,-1},{1,-1,-1,1}—may apply to each CDM group.

Hereinafter, mapping between the layer and antenna port, mapping between the antenna port and reference signal resource, or mapping between the layer and reference signal resource is described.

In the case that MIMO precoding applies in setting the downlink resource for any terminal, as many reference signal resources as the number of the transmission layers are set and for each reference signal resource a mapping relationship between the resource and antenna port may be set. Or mapping of the transmission layer to the antenna port may be considered or as a method of mapping the transmission layer directly to each of the reference signal resources, mapping the individual DM-RS pattern to the transmission layer may apply. According to these methods, the reference signal resources required depending on the rank value may be set and operated sequentially from the beginning so that the DM-RS resources set for specific transmission layer may be fixed regardless of the rank value.

TABLE 5

| Layer index | DM-RS pattern group index | Code resource index |
|---|---|---|
| 0 | 0 | 0 |
| 1 | 0 | 1 |
| 2 | 1 | 0 |
| 3 | 1 | 1 |
| 4 | 0 | 2 |
| 5 | 1 | 2 |
| 6 | 0 | 3 |
| 7 | 1 | 3 |

In the case that MIMO precoding does not apply in light of setting downlink resources to any terminal, as many reference signal resources as the number of antenna ports set for transmission are set and for each reference signal resource the antenna ports may be mapped. Or a method of mapping the individual DM-RS pattern to the individual antenna port may apply as a method of performing the setting based on a predefined mapping process. At this time, Table 6 may be referred to in which the layer index in Table 4 may be replaced with the antenna port index and the remainder may be used as is. That is, mapping between the antenna port and reference signal resource may be conducted using, as is, the mapping method as described in connection with Table 5.

TABLE 6

| Antenna port index (or order) | DM-RS pattern group index | Code resource index |
|---|---|---|
| 0 | 0 | 0 |
| 1 | 0 | 1 |
| 2 | 1 | 0 |
| 3 | 1 | 1 |
| 4 | 0 | 2 |
| 5 | 1 | 2 |
| 6 | 0 | 3 |
| 7 | 1 | 3 |

Figure 28:
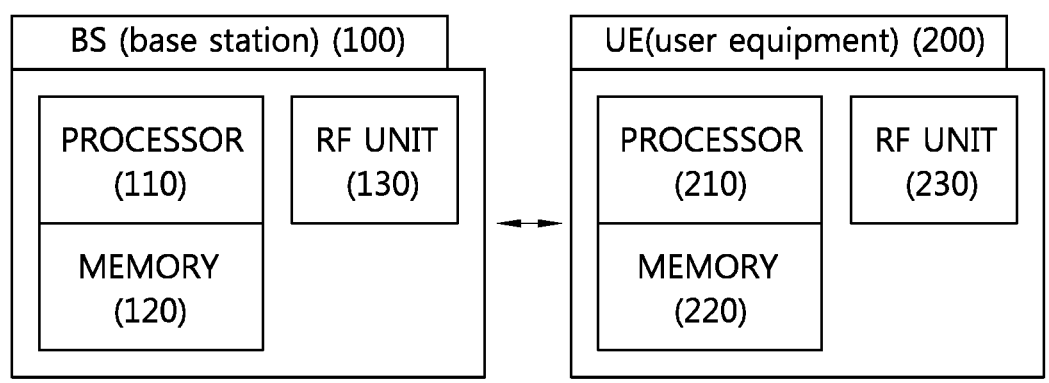
FIG. 28 is a block diagram illustrating a radio communication system implementing the embodiments of the present invention.

FIG. 28 is a block diagram illustrating a radio communication system implementing the embodiments of the present invention.

The base station 50 includes a processor 51, a memory 53, and a RF (Radio Frequency) unit 52.

The processor 51 implements the suggested functions, processes, and/or methods. The memory 53 is connected to the processor 51 and stores protocols or parameters for the multicarrier operation. The RF unit 52 is connected to the processor 51 and transmits and/or receives radio signals.

The relay station 60 includes a processor 61, a memory 62, and an RF unit 63.

The processor 61 implements the suggested functions, procedures, and/or methods. In the above-described embodiments, the operation of the relay station may be implemented by the processor 61. That is, the processor 61 receives R-PDCCH (Relay-Physical Downlink Control Channel) including backhaul control information from the base station and R-PDSCH (Relay-Physical Downlink Shared Channel) including backhaul data from the base station. In this case, the R-PDCCH is received in any one selected from plural predetermined transmission modes and uses the reference signal received through the R-PDCCH for demodulation/decoding of the R-PDCCH. The memory 62 is connected to the processor 61 and stores protocols or parameters for multicarrier operation. The RF unit 63 is connected to the processor 61 and transmits and/or receives radio signals.

The processors 51 and 61 may include ASIC's (Application-Specific Integrated Circuits), other chipsets, logic circuits, and/or data processing devices. The memories 53 and 62 may include ROM's (Read-Only Memories), RAM's (Random Access Memories), flash memories, memory cards, storage media, and/or other storage devices. The RF units 52 and 63 may include a baseband circuit for processing radio signals. When the embodiments are implemented in software, the above-described schemes may be configured in modules (procedures, functions, etc.) that perform the functions. The modules may be stored in the memories 53 and 62 and executed by the processors 51 and 61. The memories 53 and 62 may be located inside or outside the processors 51 and 61 or may be connected to the processors 51 and 61 via various known means.

Although in the above-described system the methods are described in flowchart based on a series of steps or blocks, the steps for the present invention are not limited to the order of the steps, and a step may be performed in order different from another step or simultaneously with another step. Or one of ordinary skill may understand that the steps in the flowchart are not exclusive and other steps may be included or one or more steps in the flowchart may be omitted without influencing the scope of the present invention.

The invention has been explained above with reference to exemplary embodiments. It will be evident to those skilled in the art that various modifications may be made thereto without departing from the wider spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method for demodulating a signal, performed by a relay node, the method comprising:
receiving control information, from an evolved-NodeB (eNB), through a relay-physical downlink control channel (R-PDCCH); and
receiving a data, from the eNB, through a physical downlink shared channel (PDSCH),
wherein when a number of transmission layers of the PDSCH is 2 or more than 2 and a plurality of reference signals for a demodulation of the data are transmitted on antenna ports by the eNB, a reference signal transmitted on an antenna port having a lowest antenna port number among the antenna ports is used for a demodulation of the control information.

2. The method of claim 1, wherein a number of the plurality of reference signals used for a demodulation of the data is same as a number of transmission layers of the PDSCH.

3. The method of claim 1, wherein a number of transmission layers of the R-PDCCH is 1.

4. The method of claim 1, wherein the control information and the data are received at different times in a same subframe.

5. A Relay Node (RN), comprising:
a radio frequency (RF) unit configured to transmit and receive a radio signal; and
a processor connected to the RF unit,
wherein the processor is configured to control the RF unit to receive control information, from an evolved-NodeB (eNB), through a relay-physical downlink control channel (R-PDCCH) and receives a data, from the eNB, through a physical downlink shared channel (PDSCH), and
wherein when a number of transmission layers of the PDSCH is 2 or more than 2 and a plurality of reference signals for a demodulation of the data are transmitted on antenna ports by the eNB, a reference signal transmitted on an antenna port having a lowest antenna port number among the antenna ports is used for a demodulation of the control information.

6. The RN of claim 5, wherein a number of the plurality of reference signals used for a demodulation of the data is same as a number of transmission layers of the PDSCH.

7. The RN of claim 5, wherein a number of transmission layers of the R-PDCCH is 1.

8. The RN of claim 5, wherein the control information and the data are received at different times in a same subframe.

* * * * *